(12) United States Patent
Sugaya

(10) Patent No.: US 11,601,184 B2
(45) Date of Patent: Mar. 7, 2023

(54) COMMUNICATION APPARATUS AND COMMUNICATION METHOD

(71) Applicant: Sony Group Corporation, Tokyo (JP)

(72) Inventor: Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 49 days.

(21) Appl. No.: 17/291,613

(22) PCT Filed: Nov. 21, 2019

(86) PCT No.: PCT/JP2019/045613
§ 371 (c)(1),
(2) Date: May 6, 2021

(87) PCT Pub. No.: WO2020/116184
PCT Pub. Date: Jun. 11, 2020

(65) Prior Publication Data
US 2022/0021437 A1    Jan. 20, 2022

(30) Foreign Application Priority Data

Dec. 5, 2018   (JP) .............................. JP2018-228015

(51) Int. Cl.
*H04B 7/06* (2006.01)
*H04L 1/08* (2006.01)
(Continued)

(52) U.S. Cl.
CPC ............. *H04B 7/0697* (2013.01); *H04L 1/08* (2013.01); *H04L 1/1621* (2013.01); *H04W 72/0446* (2013.01)

(58) Field of Classification Search
CPC ....... H04B 7/0697; H04L 1/08; H04L 1/1621; H04W 72/0446
See application file for complete search history.

(56) References Cited

U.S. PATENT DOCUMENTS 7,586,948 B2 * 9/2009 Hiddink ................ H04L 1/0007
709/236
2003/0169769 A1 * 9/2003 Ho ........................ H04W 24/02
370/473
(Continued)

FOREIGN PATENT DOCUMENTS

JP    2003-179528 A    6/2003
JP    2017-22739 A     1/2017

OTHER PUBLICATIONS

International Search Report and Written Opinion dated Dec. 24, 2019 received for PCT Application PCT/JP2019/045613, Filed on Nov. 21, 2019, 10 pages including English Translation.
(Continued)

*Primary Examiner* — Dac V Ha
(74) *Attorney, Agent, or Firm* — Xsensus LLP

(57) ABSTRACT

The present technology relates to a communication apparatus and a communication method that permit realization of more reliable communication.
Provided is a communication apparatus that includes a control section that performs control such that plural aggregated subframes are sent in a predetermined sequence for each frame included in each of spatially multiplexed streams when a frame is sent to another communication apparatus as plural spatially multiplexed streams. The present technology is applicable, for example, to a communication apparatus included in a wireless LAN system.

16 Claims, 15 Drawing Sheets

(51) Int. Cl.
*H04L 1/1607* (2023.01)
*H04W 72/0446* (2023.01)

(56) References Cited

U.S. PATENT DOCUMENTS

2008/0018784 A1* 1/2008 Bennett ............ H04N 21/44012
                                                        348/439.1
2017/0104570 A1* 4/2017 Kim .................. H04W 72/0446
2018/0375969 A1* 12/2018 Trainin ................ H04L 1/1835

OTHER PUBLICATIONS

Moriyama et al., "Frame Aggregation Size Selection for Improving IEEE 802.11ac MU-MIMO Downlink Throughput", In IEICE Technical Report IEICE-CQ2017-66, vol. 117, No. 185, Aug. 21, 2017, pp. 87-92.
Moriyama et al., Throughput Improvement by Dynamically Selecting Frame Aggregation Size for MU-MIMO Downlink Transmission over IEEE802.11ac WLAN, In IEICE Transactions on Information and Systems, vol. J101-B, No. 7, Jul. 1, 2018, pp. 558-569.

* cited by examiner

FIG. 4

| Reliability Space Division Multiple Capability Information Element (R-SDM Capability IE) | | | | | |
|---|---|---|---|---|---|
| Type | Length | Maximum R-SD Multiple Counts | Maximum A-MPDU Aggregate Counts | Usual R-SD Multiple Counts | Usual A-MPDU Aggregate Counts | ... |

COMMUNICATION APPARATUS AND COMMUNICATION METHOD

CROSS-REFERENCE TO RELATED APPLICATIONS

The present application is based on PCT filing PCT/JP2019/045613, filed Nov. 21, 2019, which claims priority to JP 2018-228015, filed Dec. 5, 2018, the entire contents of each are incorporated herein by reference.

TECHNICAL FIELD

The present technology relates to a communication apparatus and a communication method, and particularly, to a communication apparatus and a communication method that permit realization of more reliable communication.

BACKGROUND ART

Although compatible with best-effort communication, communication control protocols for existing wireless LAN (Local Area Network) systems are not necessarily capable of achieving adequate control over data communication requiring high reliability.

Also, recent years have seen, through aggregation of plural MPDUs (MAC Protocol Data Units), commercialization of an A-MPDU (Aggregation-MPDU) frame configuration in which MPDUs are configured as a single frame (refer, for example, to PTL 1). It is possible to ensure improved communication speed by connecting frames together with this frame aggregation.

CITATION LIST

Patent Literature

[PTL 1]
JP 2017-022739A

SUMMARY

Technical Problems

Incidentally, it is necessary to maintain robustness against errors that occur in a transmission line subjected to interference in order to realize high-reliability communication in a wireless LAN system. However, such a technical scheme has yet to be established, making technologies for realizing more reliable communication in demand.

The present technology has been devised in light of such circumstances, and it is an object of the present technology to realize more reliable communication.

Solution to Problems

A communication apparatus of a first aspect of the present technology includes a control section that performs control such that plural aggregated subframes are sent in a predetermined sequence for each frame included in each of spatially multiplexed streams when a frame is sent to another communication apparatus as plural spatially multiplexed streams.

A communication method of the first aspect of the present technology performs control such that a communication apparatus sends plural aggregated subframes in a predetermined sequence for each frame included in each of spatially multiplexed streams when a frame is sent to another communication apparatus as plural spatially multiplexed streams.

In the communication apparatus and the communication method of the first aspect of the present technology, control is performed such that plural aggregated subframes are sent in a predetermined sequence for each frame included in each of spatially multiplexed streams when a frame is sent to another communication apparatus as plural spatially multiplexed streams.

A communication apparatus of a second aspect of the present technology includes a control section that performs control such that original data is constructed for each frame included in each of spatially multiplexed streams by collecting error-free subframes from plural subframes aggregated in a predetermined sequence when a frame sent from another communication apparatus is received as plural spatially multiplexed streams.

A communication method of the second aspect of the present technology performs control such that original data is constructed for each frame included in each of spatially multiplexed streams by collecting error-free subframes from plural subframes aggregated in a predetermined sequence when a communication apparatus receives a frame sent from another communication apparatus as plural spatially multiplexed streams.

In the communication apparatus and the communication method of the second aspect of the present technology, control is performed such that original data is constructed for each frame included in each of spatially multiplexed streams by collecting error-free subframes from plural subframes aggregated in a predetermined sequence when a frame sent from another communication apparatus is received as plural spatially multiplexed streams.

It should be noted that the communication apparatuses of the first and second aspects of the present technology may be independent apparatuses or internal blocks included in a single apparatus.

BRIEF DESCRIPTION OF DRAWINGS

FIG. 4 is a diagram illustrating a configuration example of high-reliability spatial multiplexing capability information elements.

DESCRIPTION OF EMBODIMENTS

Figure 1:
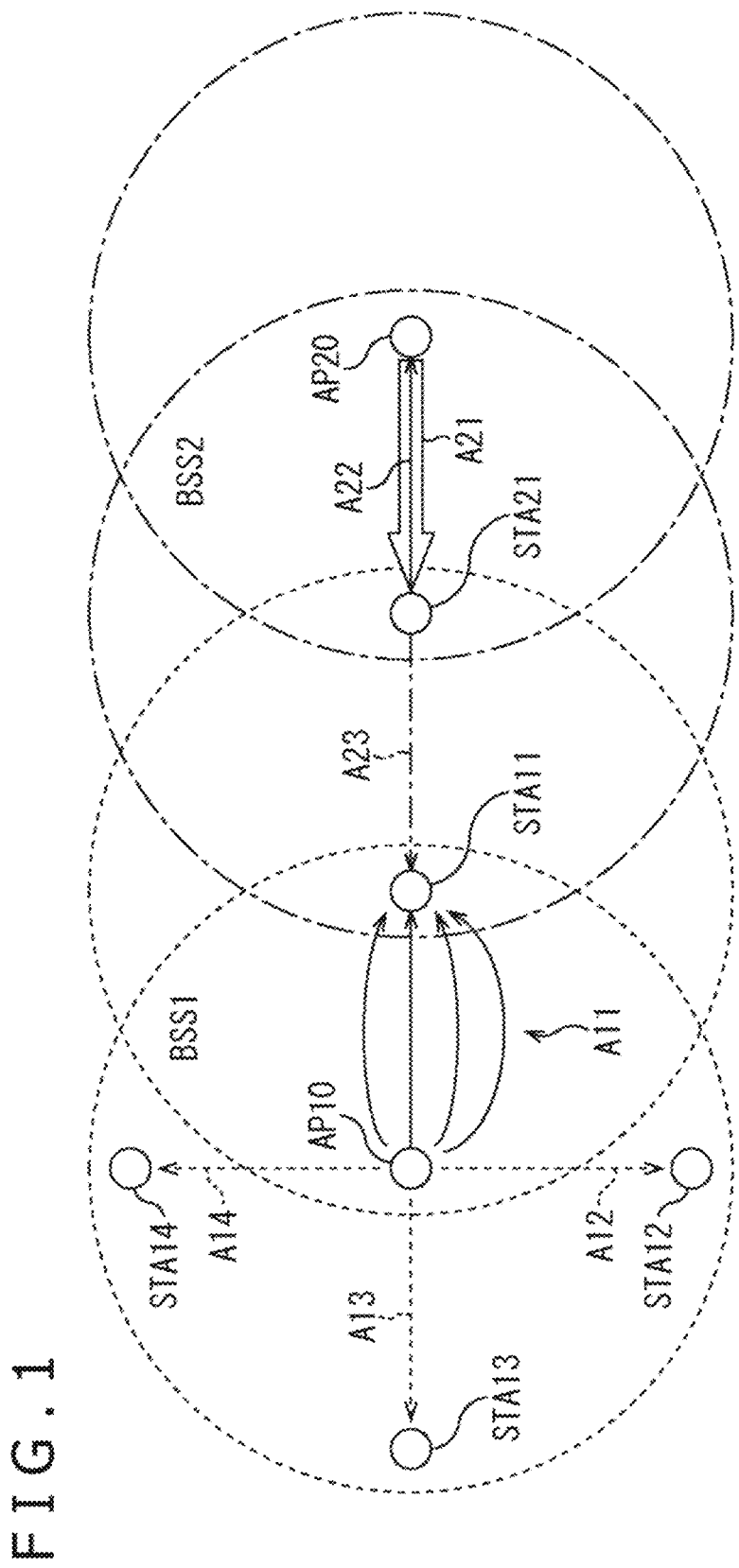
FIG. 1 is a diagram illustrating a configuration example of a wireless network.

A description will be given below of embodiments of the present technology with reference to drawings. It should be noted that the description will be given in the following order.

1. Embodiments of the present technology
2. Modification example

1. Embodiments of the Present Technology

Communication control protocols for the wireless LAN systems are compatible with best-effort communication, and in the case where a transmission line is not used for a predetermined amount of time, a revolutionary technique is employed that allows for sending of a predetermined amount of data.

Because of best-effort communication, however, it is not possible to achieve control in a convenient manner for data communication requiring high reliability.

Accordingly, a common technique under consideration for realizing high-reliability communication has been to communicate a single piece of data by using plural resources and carry out recovery through communication using another resource in the event of an error during transmission.

Recent years have seen commercialization of a technique for transmitting data simultaneously to a number of communication apparatuses on a reception side by outputting plural pieces of data from a single communication apparatus on a transmission side as spatially multiplexed streams. Also, an A-MPDU frame configuration is commercially available that transmits plural aggregated MAC protocol data units (MPDUs) as a single frame through frame aggregation.

From this, it is readily conceivable that a high-reliability communication technique can be realized by transmitting plural A-MPDU frames on a spatially multiplexed stream.

Existing communication protocols requiring high reliability have used a technique of terminating communication by sending back an ACK frame indicating proper receipt of data by the communication apparatus on the reception side after the communication has been terminated. Also, according to the technique described above in PTL 1, there is disclosed a technique of inserting a padding at the end of a frame to adjust its length in the case of spatially multiplexing an A-MPDU.

Such a simple technique of sending the same data plural times has not been enough to contribute improvement in total utilization efficiency of the transmission line because of the requirement of plural resources according to the number of times thereof. That is, if a single piece of data (A-MPDU) is sent twice in a time axis direction, it takes, readily conceivably, extra time, thus resulting in a longer duration of transmission.

Also, although simultaneous sending of a single piece of data (A-MPDU) over different frequency channels does not require a long transmission time, additional frequency resources are used, thus resulting in more frequency channels unavailable for use by other wireless networks.

In particular, in the case where data is sent by simultaneously using plural spatially multiplexed streams, and if errors occur due to interference in the time axis direction, errors occur in the same portions. As a result, it has been impossible to construct (reconstruct) all data without retransmission.

Further, although a single piece of data (A-MPDU) can be transmitted simultaneously as a spatially multiplexed stream, it has been impossible, in exchange therefor, to simultaneously send the data to plural communication apparatuses, resulting in ambiguity as to whether the wireless network as a whole improves in efficiency.

In the existing technique of confirming a receipt by returning an ACK frame, new data cannot be sent during the time before this ACK frame is returned after data has been sent. This requires additional time in the case where high-reliability communication is carried out, thus resulting in a long delay.

That is, in the case where high-reliability communication is carried out, and when all data is successfully collected early, it has been necessary to hand over the data immediately to application equipment connected to a wireless communication module. Also, the addition of a padding alone has been unable to achieve high-reliability communication even if an A-MPDU included in plural streams is used by applying the technology described in the above PTL 1.

As described above, there is required a communication method that maintains robustness against communication errors in a transmission line subjected to interference in order to realize high-reliability communication in a wireless LAN system.

Also, there is required a communication method that keeps errors to a minimum even in the event of interference in the case where the same data is transmitted simultaneously in plural multiplexing axes. Further, a communication apparatus on the reception side is required to hand over data to application equipment at an early stage in the case where data collection is completed early.

The present technology proposes a communication method (new scheme) for realizing more reliable communication (high-reliability communication) by solving the above problems.

That is, in the communication method (new scheme) to which the present technology is applied, a communication apparatus on a transmission side (e.g., base station AP) performs control such that plural subframes aggregated (through frame aggregation) are sent in a predetermined sequence for each frame (e.g., A-MPDU) included in each of spatially multiplexed streams (e.g., each of spatially multiplexed streams SD-1, SD-2, SD-3, and SD-4) when a frame (e.g., A-MPDU) is sent to a communication apparatus on a reception side (e.g., terminal station STA) as plural spatially multiplexed streams (e.g., spatially multiplexed streams SD-1 to SD-4).

Meanwhile, the communication apparatus on the reception side (e.g., terminal station STA) performs control such that original data is constructed for each frame included in each of spatially multiplexed streams (e.g., spatially multiplexed streams SD-1, SD-2, SD-3, and SD-4) by collecting error-free subframes (MPDU1 to MPDU8) from plural subframes (e.g., MPDUs) aggregated (through frame aggregation) in a predetermined sequence when a frame (e.g., A-MPDU) sent from the communication apparatus on the transmission side (e.g., base station AP) is received as plural spatially multiplexed streams (e.g., spatially multiplexed streams SD-1 to SD-4).

Here, the term "predetermined sequence" refers to changing a subframe (e.g., MPDU) sequence for each spatially multiplexed stream frame (e.g., A-MPDU). Then, the spatial multiplexing and sending, by the communication apparatus on the transmission side (e.g., base station AP), of a frame (e.g., A-MPDU) including plural subframes aggregated in order of sequence number that differs from one spatially multiplexed stream to another allows for the communication apparatus on the reception side (e.g., terminal station STA) to collect all data more positively and earlier (e.g., data MPDU1 to MPDU8) than by simultaneous reception of the same frame (e.g., A-MPDU).

Assuming, for example, transmission using two spatially multiplexed streams, a frame (e.g., A-MPDU) included in one of the spatially multiplexed streams can include subframes (e.g., MPDUs) arranged in order of sequence number (in ascending order) whereas a frame (e.g., A-MPDU) included in the other spatially multiplexed stream can include subframes (e.g., MPDUs) arranged in reverse order of sequence number (in descending order). Also, for example, subframes are arranged in each frame (e.g., A-MPDU) included in a spatially multiplexed stream such that the first subframes (e.g., MPDUs) have different sequence numbers from each other (e.g., such that the subframes start with numbers partway through sequence numbers) so as to prevent overlaps of subframe sequence numbers.

That is, for example, in the case where two spatially multiplexed streams are used, and when both frames are received successfully without error by the communication apparatus on the reception side by configuring the frames in reverse order of sequence of aggregated subframes or splitting the frames into first and second halves, it is possible to have ready a complete set of all subframe data approximately halfway through the frame. This makes it possible for the communication apparatus on the reception side to suspend the reception of frames and output received data to application equipment at an earlier stage when all subframe data is collected successfully without receiving data up to the end of the frames.

It should be noted that frames include not only data frames that include data but also, for example, ACK frames and control frames. In the present disclosure, in the case where a frame is denoted simply as a "frame," the frame refers to a data frame. Also, it can be said that plural subframes aggregated in a frame are a data frame including data (part thereof).

Hereinafter, a detailed description will be given of a communication method (new scheme) to which the present technology is applied with reference to drawings.
(Configuration Example of the Wireless Network)

FIG. 1 is a diagram illustrating a configuration example of a wireless network.

In FIG. 1, a basic service set BSS1 spans, as a first wireless network, an area indicated by a dashed line around a base station AP10 as its radio wave reach range and includes terminal stations STA11, STA12, STA13, and STA14.

Further, a basic service set BSS2 spans, as a second wireless network adjacent to the first wireless network, an area indicated by a long-dashed short-dashed line around a base station AP20 as its radio wave reach range and includes a terminal station STA21. Here, the basic service set BSS2 overlaps the basic service set BSS1 because of the terminal station STA21.

Also, in FIG. 1, plural arrows A11 pointing from the base station AP10 to the terminal station STA11 are depicted. These arrows A11 schematically illustrate that spatially multiplexed transmission is underway.

That is, spatially multiplexed transmission permits not only multiplexed transmission from the base station AP10 to the terminal stations STA11 to STA14 as depicted by the arrows A11 to A14 in the figure but also simultaneous sending of plural streams to the same terminal station STA11. Further, it is depicted here that the terminal station STA11 is located where it is capable of receiving data from the terminal station STA21.

More specifically, assuming that an ACK (Acknowledgement) frame is returned from the terminal station STA21 to the base station AP20 after frame transmission from the base station AP20 to the terminal station STA21 indicated by an arrow A21, the ACK frame in question reaches the terminal station STA11 as interference indicated by an arrow A23.

As described above, in the case where transmission of an ACK frame from the terminal station STA21 to the base station AP20 is carried out during transmission of a frame from the base station AP10 to the terminal station STA11, and if spatially multiplexed transmission is underway between the base station AP10 and the terminal station STA11, all spatially multiplexed streams (frames included in the streams) are affected similarly by interference.
(Example of Communication Sequence)

Figure 2:
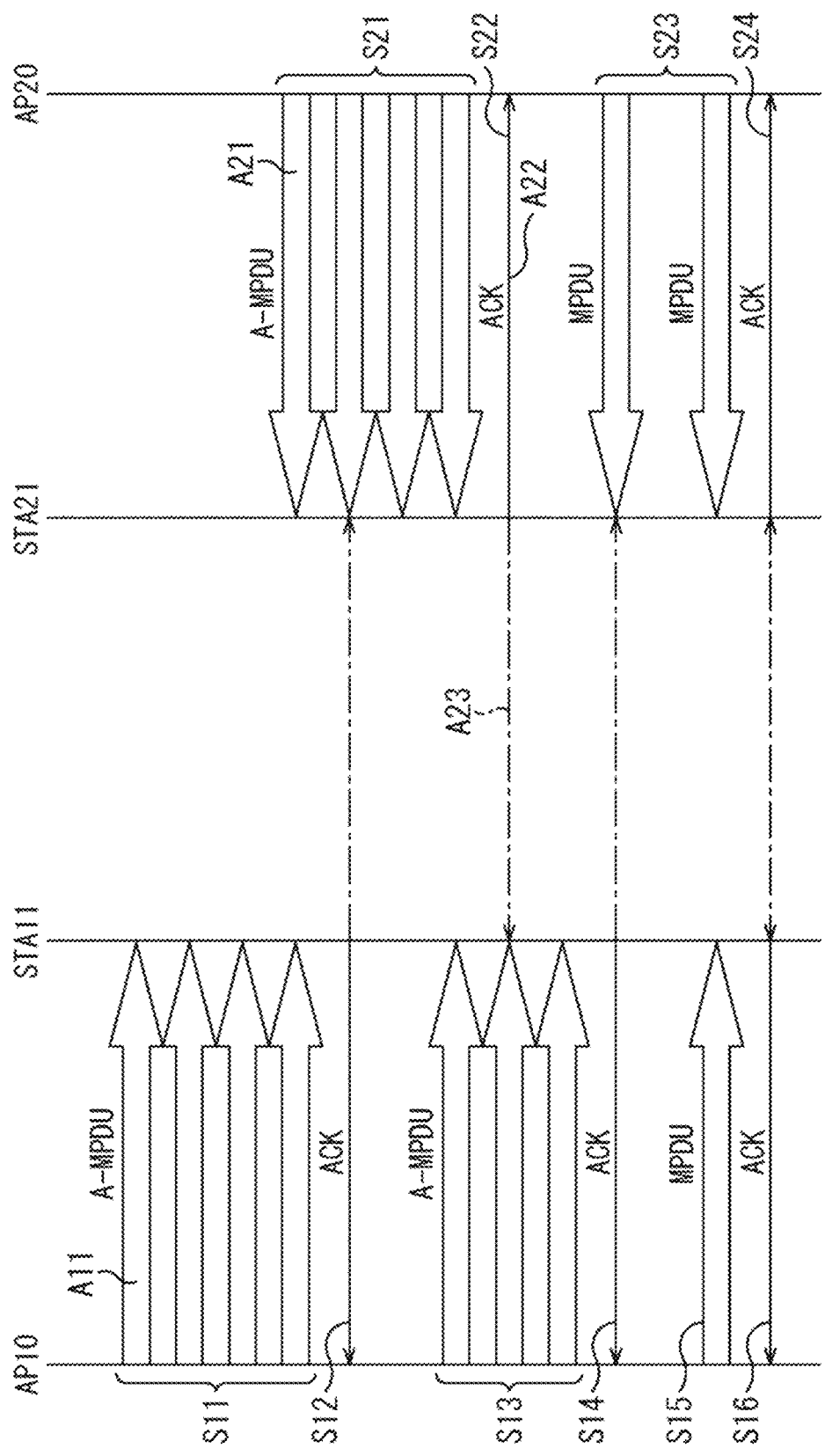
FIG. 2 is a diagram illustrating an example of a communication sequence in the case where interference occurs when spatially multiplexed transmission is carried out.

FIG. 2 illustrates an example of a communication sequence in the case where interference occurs when spatially multiplexed transmission is carried out.

FIG. 2 illustrates a communication sequence involving the base station AP10, the terminal stations STA11 and STA21, and the base station AP20, and the sequence progresses from top to bottom in the figure as time is elapsed.

Here, the frames (A-MPDUs), indicated by the arrows A11 in FIG. 1, are sent from the base station AP10 to the terminal station STA11 (S11). Meanwhile, the frames (A-MPDUs), indicated by the arrows A21 in FIG. 1, are sent from the base station AP20 to the terminal station STA21 (S21).

Then, here, an ACK frame is returned from the terminal station STA11 to the base station AP10 after the transmission of the frames (A-MPDUs) from the base station AP10 to the terminal station STA11 is over (S12). However, when an ACK frame is sent from the terminal station STA11, the ACK frame in question turns into interference for the terminal station STA21, rendering the terminal station STA21 unable to properly receive frames (A-MPDUs) from the base station AP20 (a long-dashed short-dashed line arrow in the figure).

Similarly, when an ACK frame is sent from the terminal station STA21 to the base station AP20 after the transmission of the frames (A-MPDUs) from the base station AP20 to the terminal station STA21 is over (S22), the ACK frame in question turns into interference for the terminal station STA11, rendering the terminal station STA11 unable to properly receive frames (A-MPDUs) from the base station AP10 (corresponding to the arrow A23 in FIG. 1).

In the following sequence, as the terminal station STA11 returns an ACK frame after having properly received frames from the base station AP10 (S13 and S14, and S15 and S16), the ACK frame in question similarly causes interference to the terminal station STA21. Also, as the terminal station STA21 returns an ACK frame after having properly received frames from the base station AP20 (S23 and S24), the ACK frame in question similarly causes interference to the terminal station STA11.

As described above, communication between the base station AP10 and the terminal station STA11 and that between the base station AP20 and the terminal station STA21 produce a data error to each other, causing the data to repeatedly be resent and making it difficult to positively receive all data.

(Frame Configuration Example)

Figure 3:
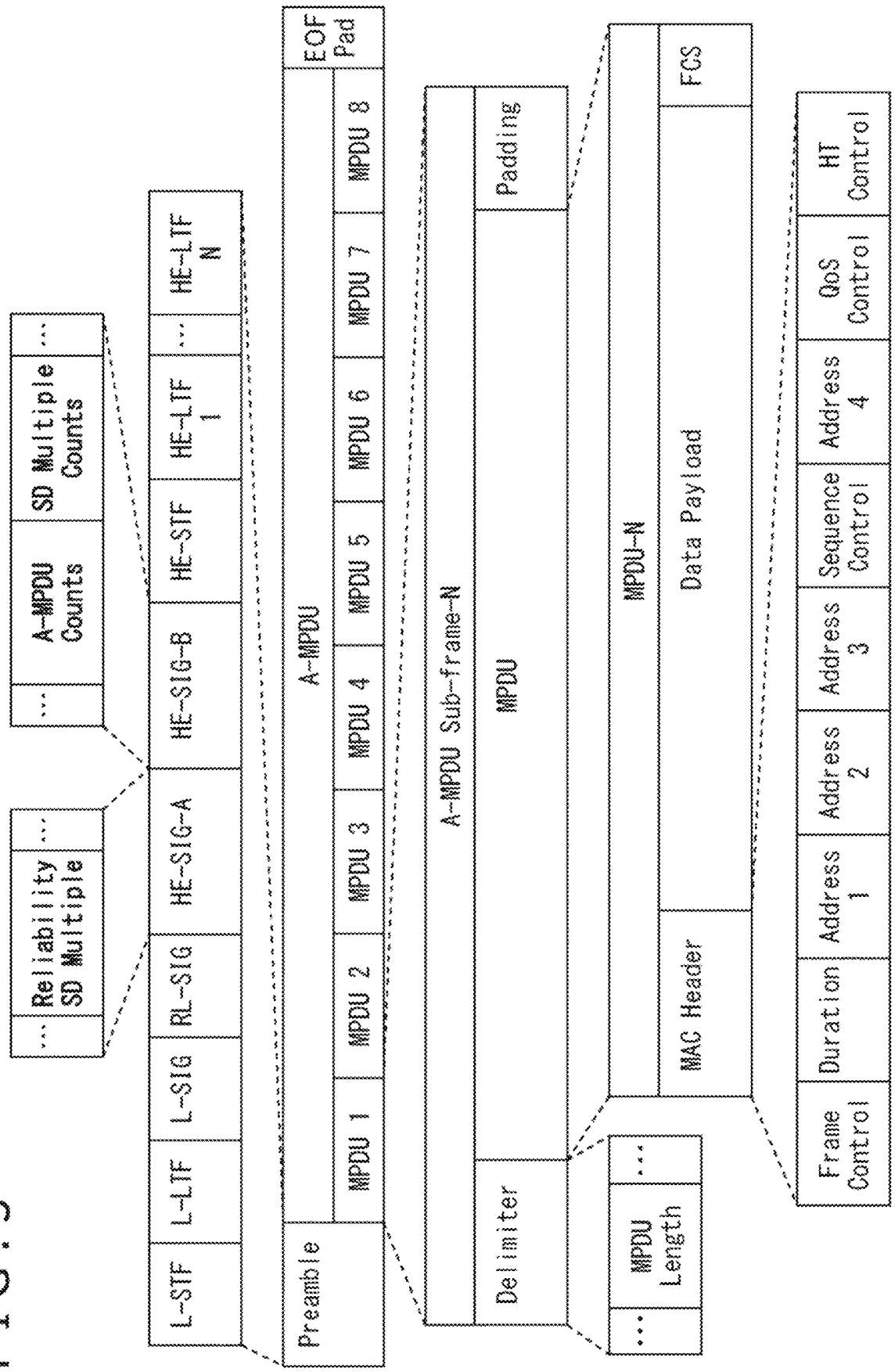
FIG. 3 is a diagram illustrating a configuration example of an A-MPDU to which frame aggregation is applied.

FIG. 3 illustrates a configuration example of an A-MPDU to which frame aggregation is applied.

An A-MPDU is sent after a PHY layer preamble signal (Preamble). The preamble signal includes, in addition to L-STF, L-LTF, L-SIG, RL-SIG, HE-SIG-A, HE-SIG-B, and HE-STF, a predetermined number of repetitions of HE-LTF commensurate with a spatial multiplexing count.

Here, HE-SIG-A includes a flag that identifies a frame that has undergone high-reliability spatial multiplexing (hereinafter, also referred to as a high-reliability spatial multiplexing flag (Reliability SD Multiple)). For example, in the case where this high-reliability spatial multiplexing flag is set and high-reliability spatial multiplexing is in progress, HE-SIG-B includes information indicating the number of A-MPDU aggregations (hereinafter, also referred to as aggregation count information (A-MPDU Counts)) and information indicating the number of spatially multiplexed streams (spatial multiplexing count) (hereinafter, also referred to as spatial multiplexing count information (SD Multiple Counts)).

An A-MPDU includes MPDUs the number of which corresponds to the number of frames aggregated. Here, for example, an example is illustrated in which an A-MPDU, as a frame, includes eight subframes MPDU1 to MPDU8. Further, these subframes (A-MPDU-N prior to multiplexing here) include not only a delimiter indicating a boundary between subframes and an MPDU (MAC Protocol Data Unit) but also a padding, as necessary, or an EOF pad at the end of the A-MPDU. It should be noted that the delimiter includes MPDU length information indicating an MPDU information length.

Also, each MPDU (MPDU-N prior to multiplexing here) includes a predetermined MAC header (MAC Header), a data payload, and an FCS (Frame Check Sequence). This MAC header includes Frame Control, Duration, Address1, Address2, Address3, Sequence Control, Address4, QoS Control, and HT Control.

Frame Control includes information regarding a frame format. Duration includes a frame duration. Address1 to Address4 include address information for identifying sending and receiving devices and the like.

Sequence Control includes an MPDU sequence number. Qos Control includes a QoS (Quality of Service) control parameter. HT Control includes a control parameter for high-throughput extension.

(Configuration Example of Capability Information)

FIG. 4 is a diagram illustrating a configuration example of high-reliability spatial multiplexing capability information elements.

High-reliability spatial multiplexing capability information elements (hereinafter, also referred to as capability information) are, for example, information for notifying of attributes of a communication apparatus (communication capability) such as the terminal station STA.

This capability information may be, for example, parameters exchanged with the base station AP in the case where the terminal station STA joins the basic service set BSS or be included in a frame exchanged through association. Also, the base station AP may notify the terminal station STA by including capability information in a predetermined beacon signal.

In FIG. 4, capability information includes Type, Length, Maximum R-SD Multiple Counts, Maximum A-MPDU Aggregate Counts, Usual R-SD Multiple Counts, and Usual A-MPDU Aggregate Counts.

Type includes information regarding element type. Length includes information regarding information length.

Maximum R-SD Multiple Counts includes information regarding a maximum spatial multiplexing count that can be handled during spatially multiplexed transmission (hereinafter, also referred to as maximum spatial multiplexing capability count information) as an attribute of the communication apparatus (communication capability) in the case where high-reliability spatial multiplexing is carried out.

Maximum A-MPDU Aggregate Counts includes information regarding a maximum aggregate count that can be handled during A-MPDU aggregation (hereinafter, also referred to as maximum aggregate capability count information) as an attribute of the communication apparatus (communication capability) in the case where high-reliability spatial multiplexing is carried out.

Usual R-SD Multiple Counts includes information regarding a usual spatial multiplexing count as an attribute of the communication apparatus in the case where normal spatial multiplexing is carried out. Usual A-MPDU Aggregate Counts includes information regarding a usual A-MPDU aggregate count as an attribute of the communication apparatus in the case where normal spatial multiplexing is carried out.

A description will be given next of a specific example of high-reliability spatially multiplexed transmission as a communication method (new scheme) to which the present technology is applied with reference to FIGS. 5 to 11. Here, spatially multiplexed transmission of the current technique illustrated in FIG. 5 will be described first for comparison, followed by the description of high-reliability spatially multiplexed transmission of the new scheme illustrated in FIGS. 6 to 11.

(Example of the Current Scheme)

Figure 5:
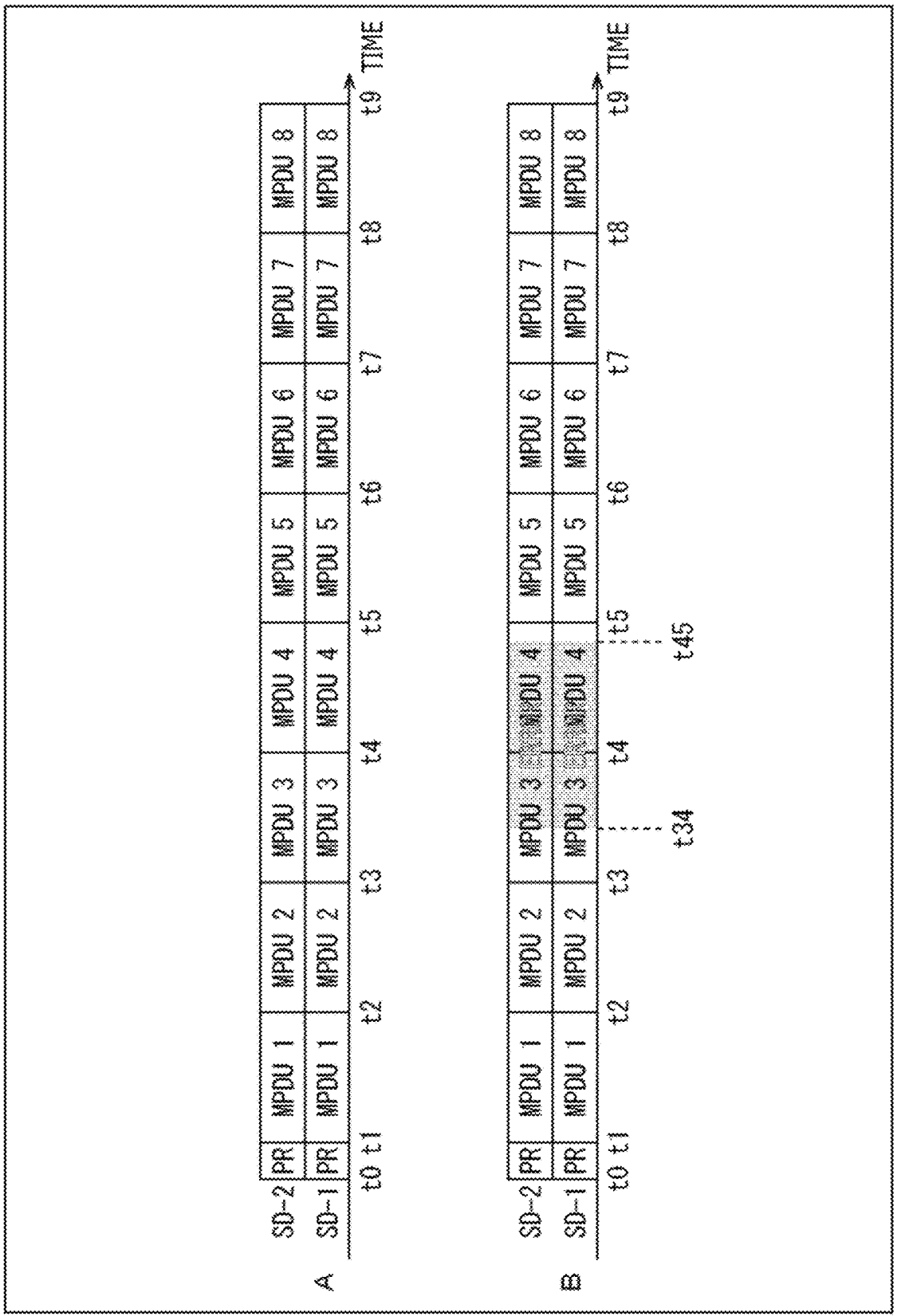
FIG. 5 depicts diagrams illustrating an example of spatially multiplexed transmission of a current scheme.

FIG. 5 illustrates an example of spatially multiplexed transmission of the current scheme.

In FIG. 5, FIG. 5A illustrates an A-MPDU frame configuration for each spatially multiplexed channel, and FIG. 5B schematically illustrates a state in which an error occurs in the case where the A-MPDU (MPDUs aggregated in the A-MPDU) is subjected to interference. Also, in FIGS. 5A and 5B, time runs horizontally (from left to right in the figures), and frequency runs vertically. It should be noted that a relation between a time axis and a frequency axis is similar in other figures described later.

In FIG. 5A, the A-MPDU includes eight aggregated subframes MPDU1 to MPDU8, and the eight consecutive MPDUs are transmitted after a preamble signal (PR: Preamble) for each of the spatially multiplexed channels SD-1 and SD-2. It should be noted that the spatially multiplexed channels are frequency channels, one assigned to each spatially multiplexed channel.

Here, an A-MPDU including MPDU1 to MPDU8 arranged in order of sequence number is transmitted by the spatially multiplexed channel SD-1. Similarly, an A-MPDU including MPDU1 to MPDU8 arranged in order of sequence number is transmitted by the spatially multiplexed channel SD-1.

More specifically, in both the spatially multiplexed channels SD-1 and SD-2, a preamble signal is sent from time t0 to time t1, MPDU1 from time t1 to time t2, MPDU2 from time t2 to time t3, MPDU3 from time t3 to time t4, MPDU4 from time t4 to time t5, MPDU5 from time t5 to time t6, MPDU6 from time t6 to time t7, MPDU7 from time t7 to time t8, and MPDU8 from time t8 to time t9.

That is, in the spatially multiplexed transmission of the current scheme, for example, the base station AP on the transmission side sends plural A-MPDUs, each having a predetermined frame configuration, in parallel for each spatially multiplexed channel, and sends identical MPDUs (data) so as to overlap each other, thus allowing for the terminal station STA on the reception side to construct (reconstruct) the A-MPDU by decoding at least one of the plural identical MPDUs (data) sent in parallel and ensuring redundancy.

Here, in the case where an ACK frame is sent from the other adjacent terminal station STA while the terminal station STA is receiving a frame (A-MPDU) from the base station AP, for example, as illustrated in FIG. 5B, errors occur at that timing in the A-MPDUs being transmitted by the spatially multiplexed channels SD-1 and SD-2.

That is, for example, in the case where an ACK frame is sent from the other terminal station STA in the period of time from time t34 to time t45, the A-MPDU received by the terminal station STA is subjected to interference. As a result, errors occur in both MPDU3 and MPDU4 included in the A-MPDU for that period of time from time t34 to time t45.

However, the frame length of each MPDU is included in Duration in the MAC header. Practically, therefore, unless delimiter information appended at the MPDU boundary (information indicating the MPDU boundary) can be received properly, MPDUs succeeding MPDU4 (subframes MPDU5 to MPDU8) cannot be received properly, either.

As described above, the spatially multiplexed transmission of the current scheme has been problematic in that the transmission efficiency has not improved significantly despite the use of an A-MPDU frame configuration.

(First Example of the New Scheme)

Figure 6:
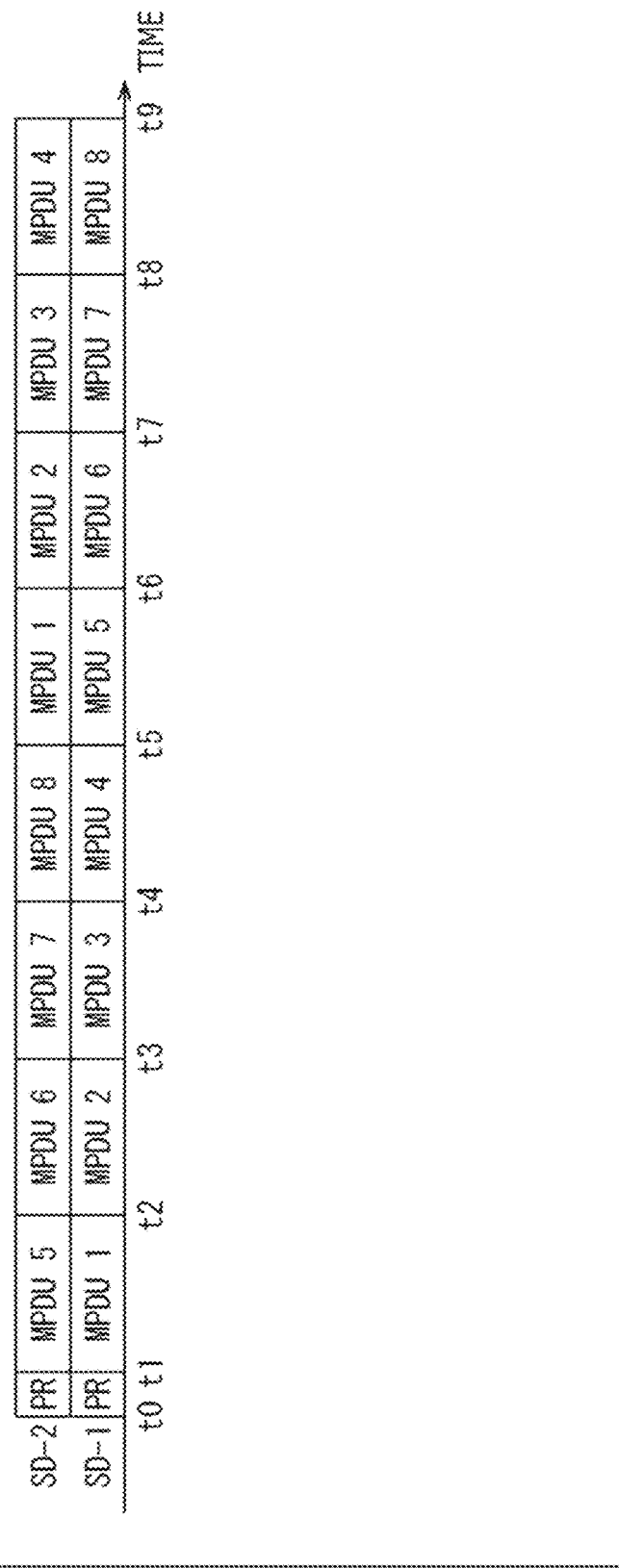
FIG. 6 is a diagram illustrating a first example of high-reliability spatially multiplexed transmission of a new scheme.

FIG. 6 illustrates a first example of high-reliability spatially multiplexed transmission of the new scheme.

In FIG. 6, an A-MPDU includes eight aggregated subframes MPDU1 to MPDU8, and the eight consecutive MPDUs are transmitted after a preamble signal (PR) for each spatially multiplexed channels SD-1 and SD-2. It should be noted, however, that the A-MPDU illustrated in FIG. 6 has a frame configuration in which the aggregated MPDUs are arranged in a different order from that of the A-MPDU illustrated in FIG. 5 described above.

Specifically, while an A-MPDU including MPDU1 to MPDU8 arranged in order of sequence number is transmitted by the spatially multiplexed channel SD-1, an A-MPDU including MPDUs that, instead of being arranged in order of sequence number, start with MPDU5 to MPDU8 followed by MPDU1 to MPDU4 in this order is transmitted by the spatially multiplexed channel SD-2.

For example, in the case where an ACK frame is sent from the other adjacent terminal station STA while the terminal station STA is receiving a frame (A-MPDU) from the base station AP, errors occur at the same timing in the A-MPDUs being transmitted by the spatially multiplexed channels SD-1 and SD-2, which is as described above. Then, high-reliability spatially multiplexed transmission of the new scheme employs an A-MPDU frame configuration illustrated in FIG. 6, keeping the spatially multiplexed channels SD-1 and SD-2 free from errors even in the event of receiving interference at the same timing and providing improved utilization efficiency for the transmission line as compared to spatially multiplexed transmission of the current scheme.

Also, using the A-MPDU frame configuration illustrated in FIG. 6 allows for the terminal station STA to receive MPDU1 to MPDU4 transmitted by the spatially multiplexed channel SD-1 and MPDU5 to MPDU8 transmitted by the spatially multiplexed channel SD-2 from time t1 to time t4, for example, in the case where an error occurs in the second half of the frame from time t5 onward, thus making it possible to have ready a complete set of all MPDU data. Accordingly, if the first half of the A-MPDU frame is received successfully, there is no need to resend the MPDUs. Also, at this time, the portions of data of the respective A-MPDU frames from time t5 onward are received in duplicate, thus making it possible for the terminal station STA to halt the reception of the MPDUs from time t5 onward.

(Second Example of the New Scheme)

Figure 7:
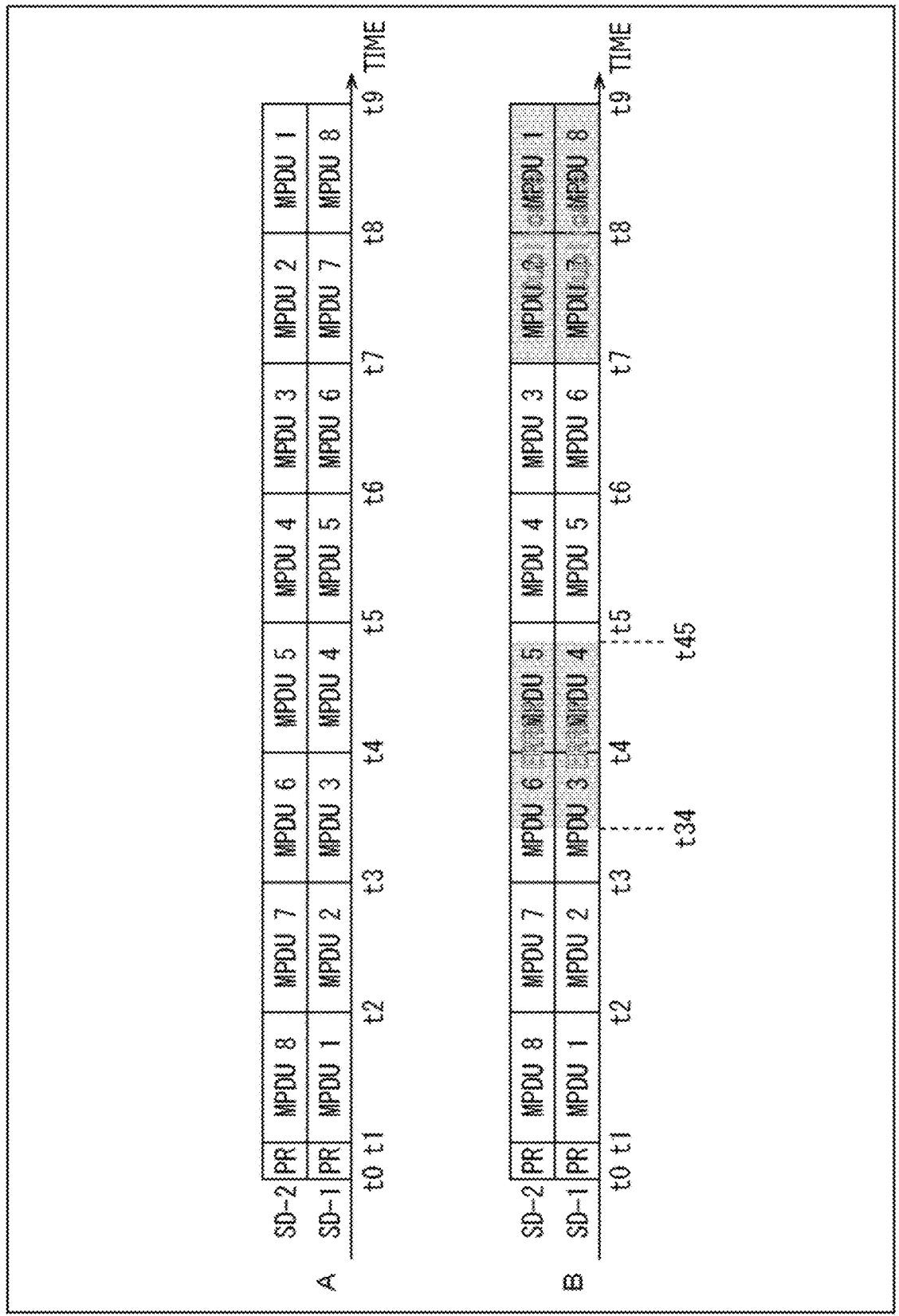
FIG. 7 depicts diagrams illustrating a second example of high-reliability spatially multiplexed transmission of the new scheme.

FIG. 7 illustrates a second example of high-reliability spatially multiplexed transmission of the new scheme.

In FIG. 7, FIG. 7A illustrates an A-MPDU frame configuration for each spatially multiplexed channel, and FIG. 7B schematically illustrates a state in which an error occurs in the case where the A-MPDU (MPDUs aggregated in the A-MPDU) is subjected to interference.

In FIG. 7A, the A-MPDU includes eight aggregated subframes MPDU1 to MPDU8, and the eight consecutive MPDUs are transmitted after a preamble signal (PR) for each spatially multiplexed channels SD-1 and SD-2. It should be noted that, in the A-MPDU frame configuration illustrated in FIG. 7A, the aggregated MPDUs are in different order from the A-MPDU frame configuration illustrated in FIG. 6.

Specifically, while an A-MPDU including MPDU1 to MPDU8 arranged in order of sequence number is transmitted by the spatially multiplexed channel SD-1, an A-MPDU including MPDU8 to MPDU1 that are arranged in reverse order (in descending order) of sequence number is transmitted by the spatially multiplexed channel SD-2.

For example, even when an ACK frame is sent from the other adjacent terminal station STA while the terminal station STA is receiving a frame (A-MPDU) from the base station AP, using the A-MPDU frame configuration illustrated in FIG. 7A keeps the spatially multiplexed channels SD-1 and SD-2 free from errors in the same MPDUs, thus contributing to improved utilization efficiency of the transmission line as compared to spatially multiplexed transmission of the current scheme.

Also, using the A-MPDU frame configuration illustrated in FIG. 7A allows for the terminal station STA to receive MPDU1 to MPDU4 transmitted by the spatially multiplexed channel SD-1 and MPDU8 to MPDU5 transmitted by the spatially multiplexed channel SD-2 by time t4, for example, even in the case where an error occurs in the second half of the frame from time t5 onward, thus making it possible to have ready a complete set of all MPDU data. Accordingly, if the first half of the A-MPDU frame is received successfully, there is no need to resend the MPDUs.

Here, in the case where an ACK frame is sent from the other adjacent terminal station STA while the terminal station STA is receiving a frame (A-MPDU) from the base station AP, for example, as illustrated in FIG. 7B, errors occur at that timing in the A-MPDUs being transmitted by the spatially multiplexed channels SD-1 and SD-2.

That is, for example, in the case where an ACK frame is sent from the other terminal station STA in the period of time from time t34 to time t45, errors occur in both MPDU3 and MPDU4 transmitted by the spatially multiplexed channel SD-1 and in both MPDU6 and MPDU5 transmitted by the spatially multiplexed channel SD-2 for the period of time during which the ACK frame is sent.

At this time, if delimiter information (information indicating the MPDU boundary) of MPDU5 transmitted by the spatially multiplexed channel SD-1 or that of MPDU4 transmitted by the spatially multiplexed channel SD-2 can be received properly, the terminal station STA can recover the succeeding MPDUs. Alternatively, information regarding Durations of the remaining MPDUs may be calculated backward from information regarding Length and information regarding MPDU Duration included in the preamble signal already received.

This ensures that the terminal station STA has ready a complete set of all MPDU data at the time corresponding to time t7 when MPDU3, MPDU4, MPDU5, and MPDU6 that have yet to be received due to interference caused by the ACK frame from the other terminal station STA are received. It should be noted that the portions of data of the respective A-MPDU frames from time t7 onward are received in duplicate, thus making it impossible for the terminal station STA to halt the reception of the MPDUs from time t7 onward.

As described above, the terminal station STA can acquire data of all the MPDUs without receiving the A-MPDU frame up to the end and output data early to application equipment connected to the wireless communication module at the time of acquisition.

(Third Example of the New Scheme)

Figure 8:
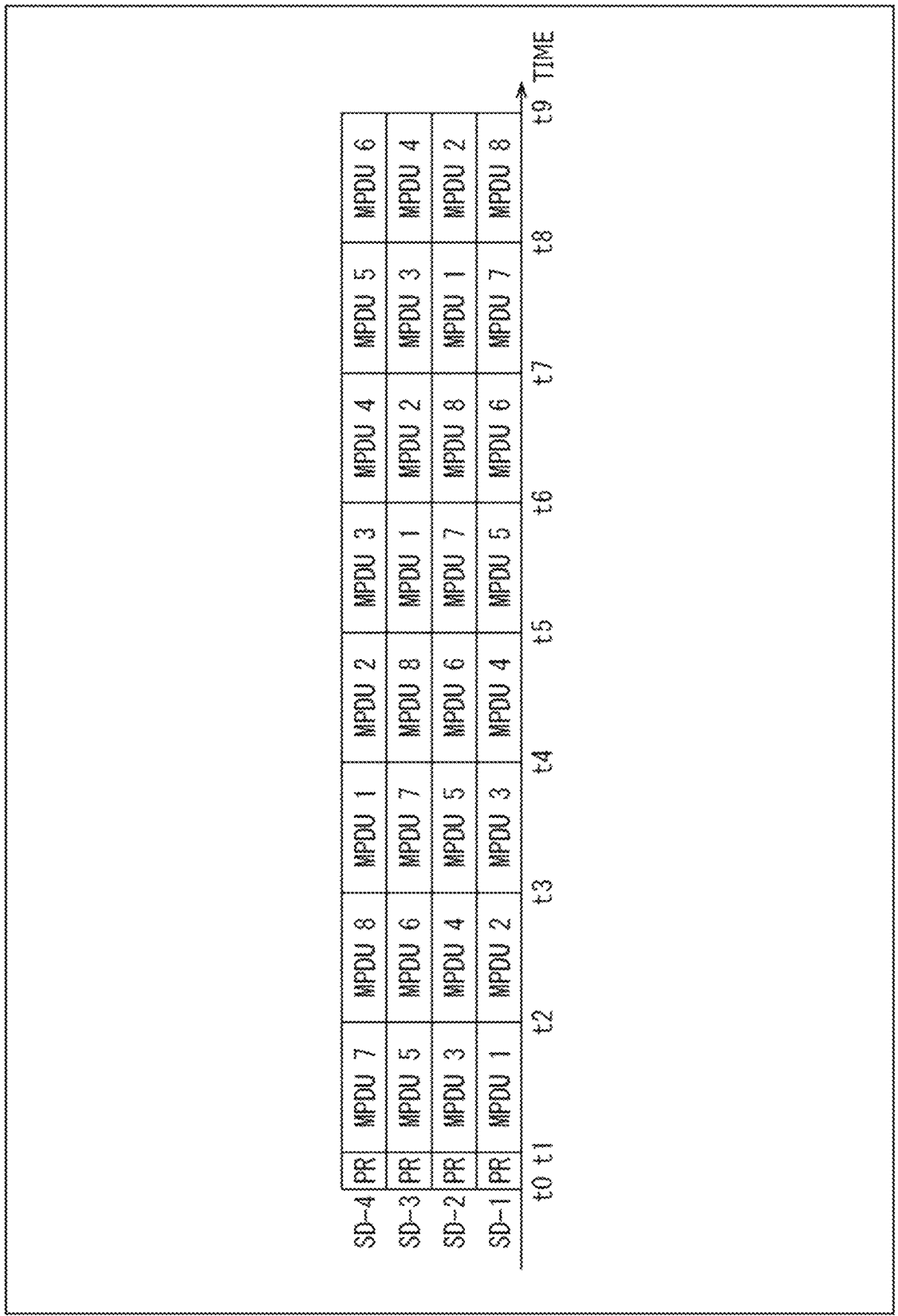
FIG. 8 is a diagram illustrating a third example of high-reliability spatially multiplexed transmission of the new scheme.

FIG. 8 illustrates a third example of high-reliability spatially multiplexed transmission of the new scheme.

In FIG. 8, an A-MPDU frame includes aggregated subframes MPDU1 to MPDU8, and the eight consecutive MPDUs are transmitted after a preamble signal (PR) for each of the spatially multiplexed channels SD-1 to SD-4. That is, in FIG. 8, more reliable communication is realized by transmitting four A-MPDU frames simultaneously with the spatially multiplexed channels SD-1 to SD-4.

Specifically, while an A-MPDU including MPDU1 to MPDU8 arranged in order of sequence number is transmitted by the spatially multiplexed channel SD-1, A-MPDUs including MPDU1 to MPDU8 arranged, respectively, in different orders from order of sequence number are transmitted by the spatially multiplexed channels SD-2 to SD-4. In other words, the first MPDUs of the four A-MPDUs transmitted simultaneously have different sequence numbers from each other.

That is, an A-MPDU including MPDUs that start with MPDU3 to MPDU8 followed by MPDU1 and MPDU2 in this order is transmitted by the spatially multiplexed channel SD-2, an A-MPDU that starts with MPDU5 to MPDU8 followed by MPDU1 to MPDU4 in this order is transmitted by the spatially multiplexed channel SD-3, and an A-MPDU that starts with MPDU7 and MPDU8 followed by MPDU1 to MPDU6 in this order is transmitted by the spatially multiplexed channel SD-4.

For example, in the case where an ACK frame is sent from the other adjacent terminal station STA while the terminal station STA is receiving a frame (A-MPDU) from the base station AP, errors occur at the same timing in the A-MPDUs being transmitted by the spatially multiplexed channels SD-1 to SD-4, which is as described above. Then, high-reliability spatially multiplexed transmission of the new scheme employs an A-MPDU frame configuration illustrated in FIG. 8, keeping the spatially multiplexed channels SD-1 to SD-4 free from errors even in the event of receiving interference at the same timing and providing improved utilization efficiency for the transmission line as compared to spatially multiplexed transmission of the current scheme.

Also, using the A-MPDU frame configuration illustrated in FIG. 8 allows for the terminal station STA to receive MPDU1 and MPDU2, MPDU3 and MPDU4, MPDU5 and MPDU6, and MPDU7 and MPDU8 transmitted by the respective spatially multiplexed channels SD-1 to SD-4 from time t1 to time t3, for example, even in the case where errors occur in the frames from time t3 onward, thus making it possible to have ready a complete set of all MPDU data. Accordingly, if the first half of the A-MPDU frame is received successfully, there is no need to resend the MPDUs. Also, at this time, the portions of data of the respective A-MPDU frames from time t3 onward are received in duplicate, thus making it possible for the terminal station STA to halt the reception of the MPDUs from time t3 onward.

(Fourth Example of the New Scheme)

Figure 9:
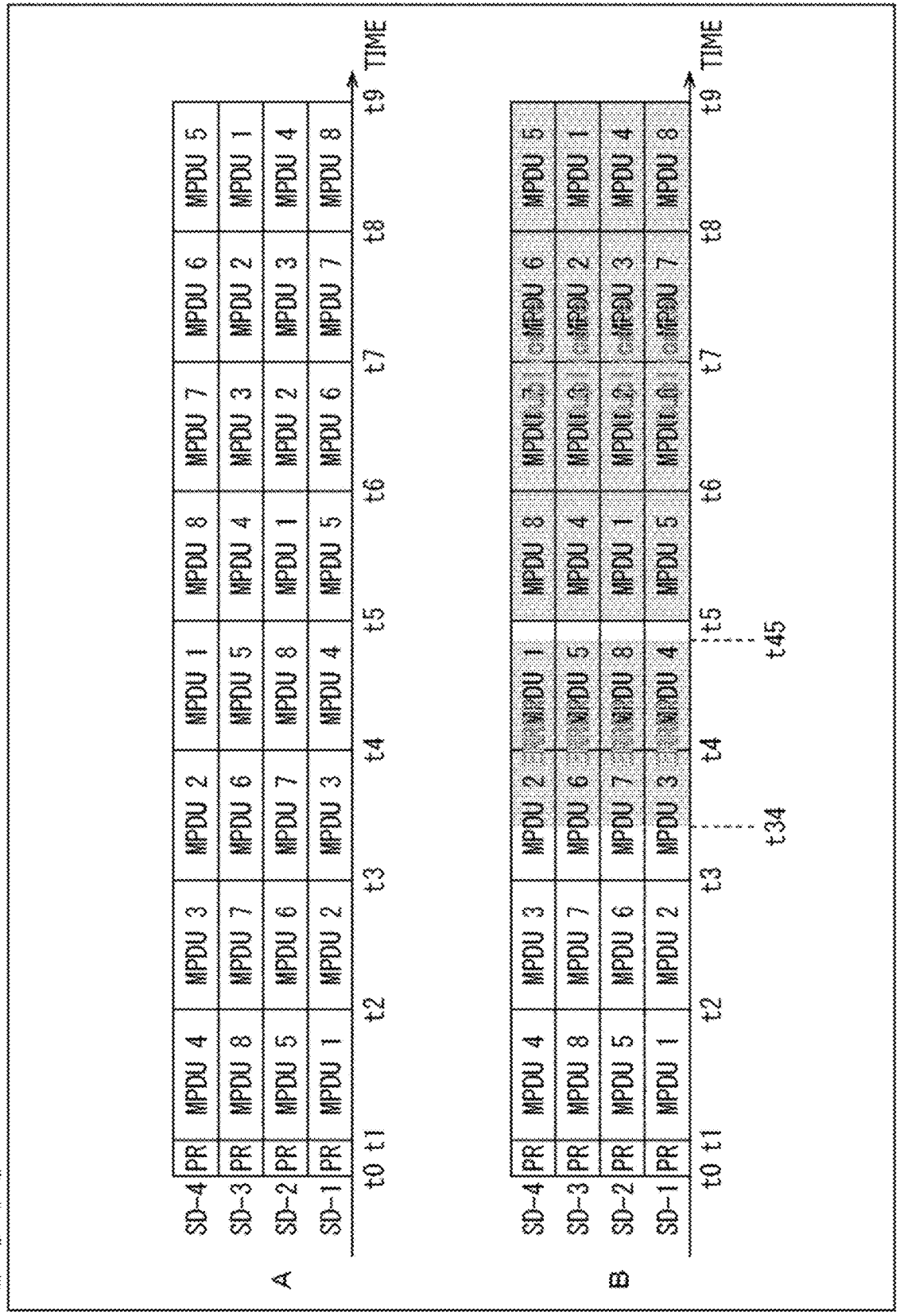
FIG. 9 depicts diagrams illustrating a fourth example of high-reliability spatially multiplexed transmission of the new scheme.

FIG. 9 illustrates a fourth example of high-reliability spatially multiplexed transmission of the new scheme.

In FIG. 9, FIG. 9A illustrates an A-MPDU frame configuration for each spatially multiplexed channel, and FIG. 9B schematically illustrates a state in which an error occurs in the case where the A-MPDU (MPDUs aggregated in the A-MPDU) is subjected to interference.

In FIG. 9A, the A-MPDU includes eight aggregated subframes MPDU1 to MPDU8, and the eight consecutive MPDUs are transmitted after a preamble signal (PR) for each of the spatially multiplexed channels SD-1 to SD-4. That is, in FIG. 9A, more reliable communication is realized by transmitting four A-MPDU frames simultaneously with the spatially multiplexed channels SD-1 to SD-4 as in FIG. 8.

Specifically, while an A-MPDU including MPDU1 to MPDU8 arranged in order of sequence number is transmitted by the spatially multiplexed channel SD-1, A-MPDUs including MPDU1 to MPDU8, respectively, in different orders from order of sequence number are transmitted by the spatially multiplexed channels SD-2 to SD-4. In other words, the first MPDUs of the four A-MPDUs transmitted simultaneously have different sequence numbers from each other.

That is, an A-MPDU that starts with MPDU5 to MPDU8 followed by MPDU1 to MPDU4 in this order is transmitted by the spatially multiplexed channel SD-2, an A-MPDU including MPDU8 to MPDU1 arranged in reverse order of sequence number (in descending order) is transmitted by the spatially multiplexed channel SD-3, and an A-MPDU that starts with MPDU4 to MPDU1 followed by MPDU8 to MPDU5 in this order is transmitted by the spatially multiplexed channel SD-4.

Here, as illustrated in FIG. 9B, for example, in the case where an ACK frame is sent from the other adjacent terminal station STA while the terminal station STA is receiving a frame (A-MPDU) from the base station AP, errors occur at that timing in the A-MPDUs being transmitted by the spatially multiplexed channels SD-1 to SD-4.

That is, for example, in the case where an ACK frame is sent from the other terminal station STA in the period of time from time t34 to time t45, errors occur in both MPDU3 and MPDU4 transmitted by the spatially multiplexed channel SD-1, in both MPDU7 and MPDU8 transmitted by the spatially multiplexed channel SD-2, in both MPDU6 and MPDU5 transmitted by the spatially multiplexed channel SD-3, and in both MPDU2 and MPDU1 transmitted by the spatially multiplexed channel SD-4 for the period of time during which the ACK frame is sent.

Here, even in the case where errors occur in any portions of the frames from time t3 onward, the terminal station STA can receive MPDU1 and MPDU2 transmitted by the spatially multiplexed channel SD-1, MPDU5 and MPDU6 transmitted by the spatially multiplexed channel SD-2, MPDU8 and MPDU7 transmitted by the spatially multiplexed channel SD-3, and MPDU4 and MPDU3 transmitted by the spatially multiplexed channel SD-4 by time t3, thus having ready a complete set of all MPDU data.

Accordingly, even in the case where errors occur in the MPDUs transmitted by the spatially multiplexed streams SD-1 to SD-4 in the period of time from time t34 to time t45, the terminal station STA has already received MPDU1 to MPDU8 transmitted, respectively, by the spatially multiplexed streams SD-1 to SD-4 from time t1 to time t3, thus making it possible to avoid adverse impact of interference caused by an ACK frame from the other terminal station STA.

It should be noted that the portions of data of the respective A-MPDU frames from time t5 onward are received in duplicate, thus making it possible for the terminal station STA to halt the reception of the MPDUs from time t5 onward. Further, if the reception of the MPDUs from time t3 onward is halted, it is possible to proactively prevent adverse impact of interference caused by an ACK frame from the other terminal station STA.

As described above, the terminal station STA can acquire data of all the MPDUs without receiving the A-MPDU frame up to the end and output data early to the connected application equipment at the time of acquisition.

(Fifth Example of the New Scheme)

Figure 10:
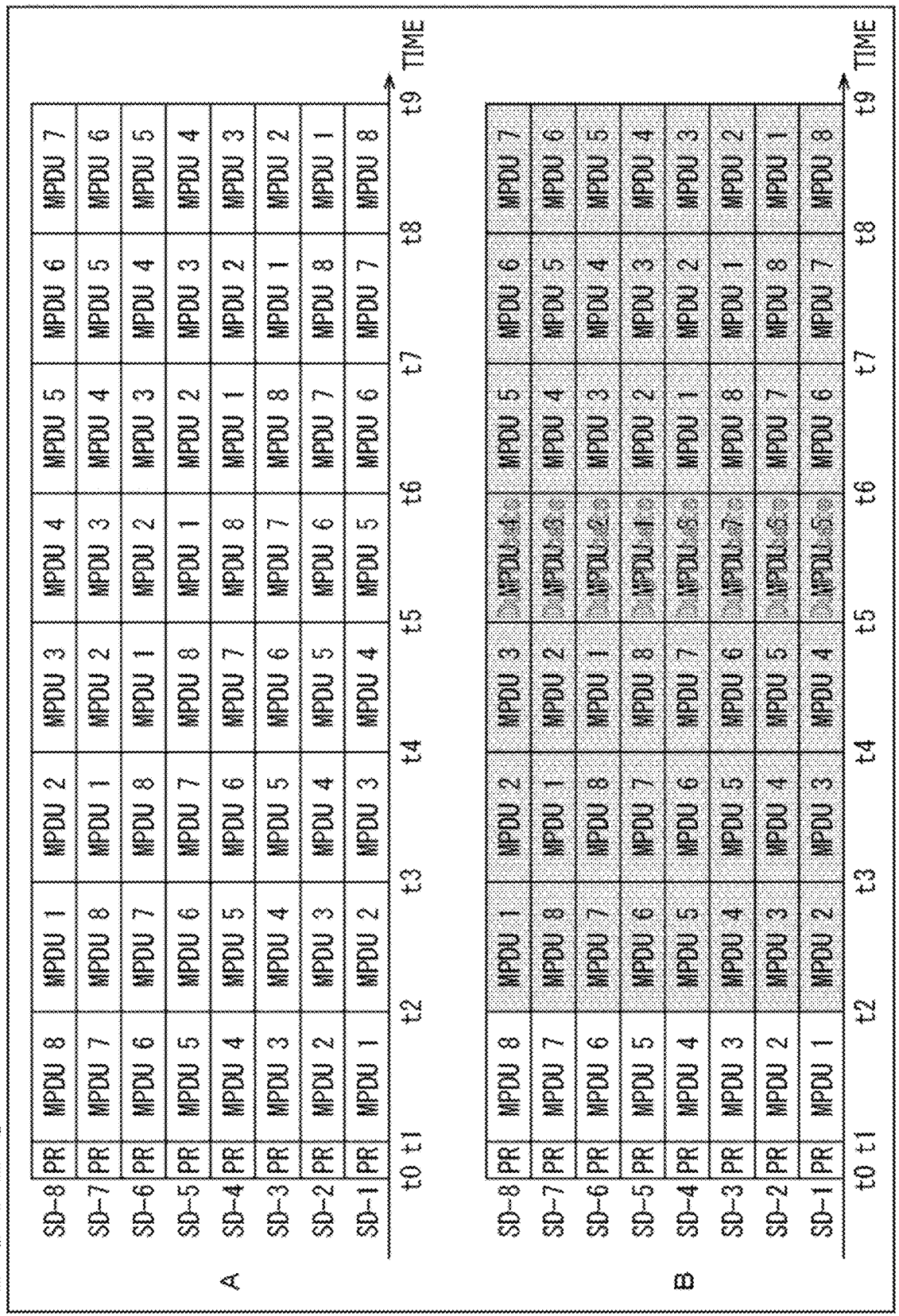
FIG. 10 depicts diagrams illustrating a fifth example of high-reliability spatially multiplexed transmission of the new scheme.

FIG. 10 illustrates a fifth example of high-reliability spatially multiplexed transmission of the new scheme.

In FIG. 10, FIG. 10A illustrates an A-MPDU frame configuration, and FIG. 10B schematically illustrates a state in which an A-MPDU is received.

In FIG. 10A, the A-MPDU includes eight aggregated subframes MPDU1 to MPDU8, and the eight consecutive MPDUs are transmitted after a preamble signal (PR) for each of the spatially multiplexed channels SD-1 to SD-8. That is, in FIG. 10A, even more reliable communication is realized by transmitting eight A-MPDU frames simultaneously with the spatially multiplexed channels SD-1 to SD-8.

Specifically, while an A-MPDU including MPDU1 to MPDU8 arranged in order of sequence number is transmitted by the spatially multiplexed channel SD-1, A-MPDUs including MPDU1 to MPDU8, respectively, in different orders from order of sequence number are transmitted by the spatially multiplexed channels SD-2 to SD-8. In other words, the first MPDUs of the eight A-MPDU frames transmitted simultaneously have different sequence numbers from each other.

That is, an A-MPDU that starts with MPDU2 to MPDU8 followed by MPDU1 in this order is transmitted by the spatially multiplexed channel SD-2, an A-MPDU that starts with MPDU3 to MPDU8 followed by MPDU1 and MPDU2 in this order is transmitted by the spatially multiplexed channel SD-3, and an A-MPDU that starts with MPDU4 to MPDU8 followed by MPDU1 to MPDU3 in this order is transmitted by the spatially multiplexed channel SD-4.

Also, an A-MPDU that starts with MPDU5 to MPDU8 followed by MPDU1 to MPDU4 in this order is transmitted by the spatially multiplexed channel SD-5, an A-MPDU including MPDU6 to MPDU8 followed by MPDU1 to MPDU5 in this order is transmitted by the spatially multiplexed channel SD-6, an A-MPDU that starts with MPDU7 and MPDU8 followed by MPDU1 to MPDU6 in this order is transmitted by the spatially multiplexed channel SD-7, and an A-MPDU that starts with MPDU8 followed by MPDU1 to MPDU7 in this order is transmitted by the spatially multiplexed channel SD-8.

Using the A-MPDU frame configuration illustrated in FIG. 10A allows for the terminal station STA to receive MPDU1 to MPDU8 transmitted, respectively, by the spatially multiplexed channels SD-1 to SD-8 from time t1 to time t2. Here, regardless of which positions of the MPDUs transmitted, respectively, by the spatially multiplexed channels SD-1 to SD-8 are subjected to interference caused by an ACK frame from the other terminal station STA, as long as information regarding Duration included in the MAC header of the first MPDU transmitted by each of the spatially multiplexed channels SD-1 to SD-8, it is possible to know, by analogy, all MPDU configurations within the A-MPDU frame, thus allowing for more reliable decoding of all MPDU data.

Accordingly, the terminal station STA has ready a complete set of all MPDU data if all the first MPDUs transmitted, respectively, by the spatially multiplexed channels SD-1 to SD-8 can be received in the period of time from time t1 to time t2 before receiving interference on the transmission line as illustrated in FIG. 10B.

It should be noted that the portions of data of the respective A-MPDU frames from time t2 onward are received in duplicate, thus making it possible for the terminal station STA to halt the reception of the MPDUs from time t2 onward. If the spatially multiplexed channels SDs (SD-1 to SD-8) can receive the first subframes (MPDUs) without any error by setting the number of spatially multiplexed streams identified by the spatially multiplexed channels SDs (spatial multiplexing count) equal to the number of frame (A-MPDU) aggregations, all subframes (MPDU1 to MPDU8) can be collected, thus making it possible to use the remaining time for a new communication sequence.

As described above, the terminal station STA can acquire all MPDU data without receiving the A-MPDU frame up to the end and output data early to the connected application equipment at the time of acquisition.

(Sixth Example of the New Scheme)

Figure 11:
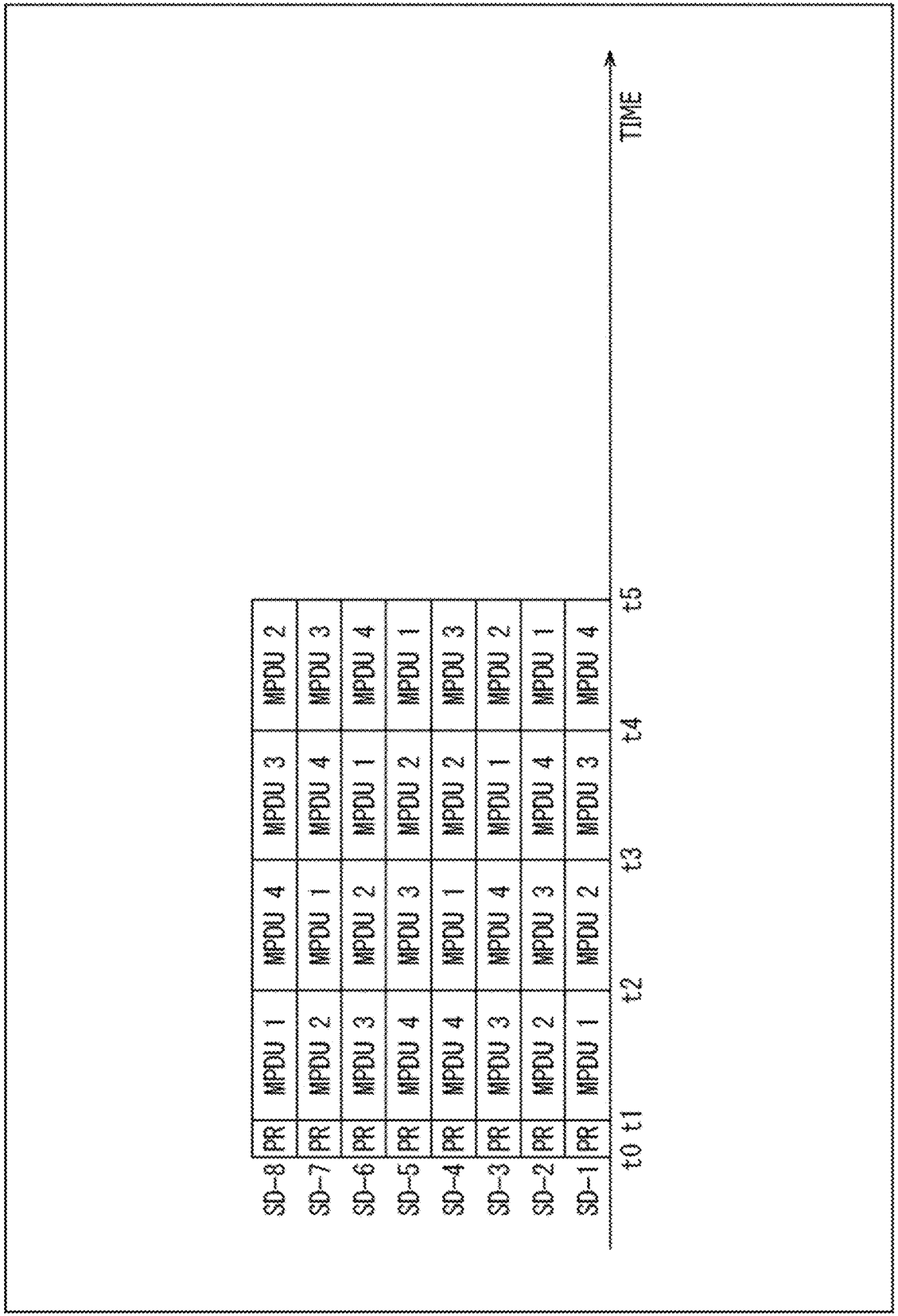
FIG. 11 is a diagram illustrating a sixth example of high-reliability spatially multiplexed transmission of the new scheme.

FIG. 11 illustrates a sixth example of high-reliability spatially multiplexed transmission of the new scheme.

FIG. 11 illustrates an A-MPDU frame configuration in the case where the number of spatially multiplexed streams (spatial multiplexing count) and the number of A-MPDU frame aggregations do not match in terms of their relation. Here, FIG. 11 illustrates an A-MPDU frame configuration in the case where there are four aggregations while there are eight spatially multiplexed streams.

Specifically, while an A-MPDU including MPDU1 to MPDU4 arranged in order of sequence number is transmitted by the spatially multiplexed channel SD-1, an A-MPDU that starts with MPDU2 to MPDU4 followed by MPDU1 in this order is transmitted by the spatially multiplexed channel SD-2. Further, an A-MPDU that starts with MPDU3 and MPDU4 followed by MPDU1 and MPDU2 in this order is transmitted by the spatially multiplexed channel SD-3, and an A-MPDU that starts with MPDU4 followed by MPDU1 to MPDU3 in this order is transmitted by the spatially multiplexed channel SD-4.

Also, an A-MPDU including MPDU4 to MPDU1 that are arranged in reverse order (in descending order) of sequence number is transmitted by the spatially multiplexed channel SD-5, and an A-MPDU that starts with MPDU3 to MPDU1 followed by MPDU4 in this order is transmitted by the spatially multiplexed channel SD-6. Further, an A-MPDU that starts with MPDU2 and MPDU1 followed by MPDU4 and MPDU3 in this order is transmitted by the spatially multiplexed channel SD-7, and an A-MPDU that starts with MPDU1 followed by MPDU4 to MPDU2 in this order is transmitted by the spatially multiplexed channel SD-8.

As described above, eight A-MPDU frames with MPDU1 to MPDU4 arranged in different orders from each other are transmitted simultaneously by the spatially multiplexed channels SD-1 to SD-8 as A-MPDUs including MPDU1 to MPDU4 arranged in predetermined order commensurate with the number of aggregations, namely, four, thus allowing for more reliable communication.

It should be noted that, although a case is illustrated in the sixth example in FIG. 11 where the number of aggregations is four and the number of spatially multiplexed streams (spatial multiplexing count) is eight, the number of aggregations and the number of spatially multiplexed streams are not limited thereto, and, for example, desired numbers of aggregations and spatially multiplexed streams may be used commensurate with the level of reliability required of the frames to be transmitted. For example, while numbers such as 2, 4, 8, and 16 can be specified as the number of aggregations, numbers such as 2, 4, 8, and 16 can be specified as the number of spatially multiplexed streams, and when the number of aggregations and the number of spatially multiplexed streams are specified, either the same number or different numbers may be specified.

A description has been given above of specific examples of high-reliability spatially multiplexed transmission as a communication method (new scheme) to which the present technology is applied. In this high-reliability spatially multiplexed transmission of the new scheme, when a frame is sent as plural spatially multiplexed streams, plural aggregated subframes (MPDUs) are sent in a predetermined sequence for each frame (A-MPDU). At this time, a variety of sequences of the plural aggregated subframes (MPDUs) can be used for each spatially multiplexed stream in a manner commensurate with the number of spatially multiplexed streams and the number of aggregations as described above.

As this sequence, for example, subframes can be arranged in order of sequence number, or in reverse order of sequence number. Also, for example, subframes may be arranged in such an order that the first subframes have different sequence numbers from each other. At this time, subframes are arranged in ascending or descending order of sequence number.

(Configuration Example of the Communication Apparatus)

Figure 12:
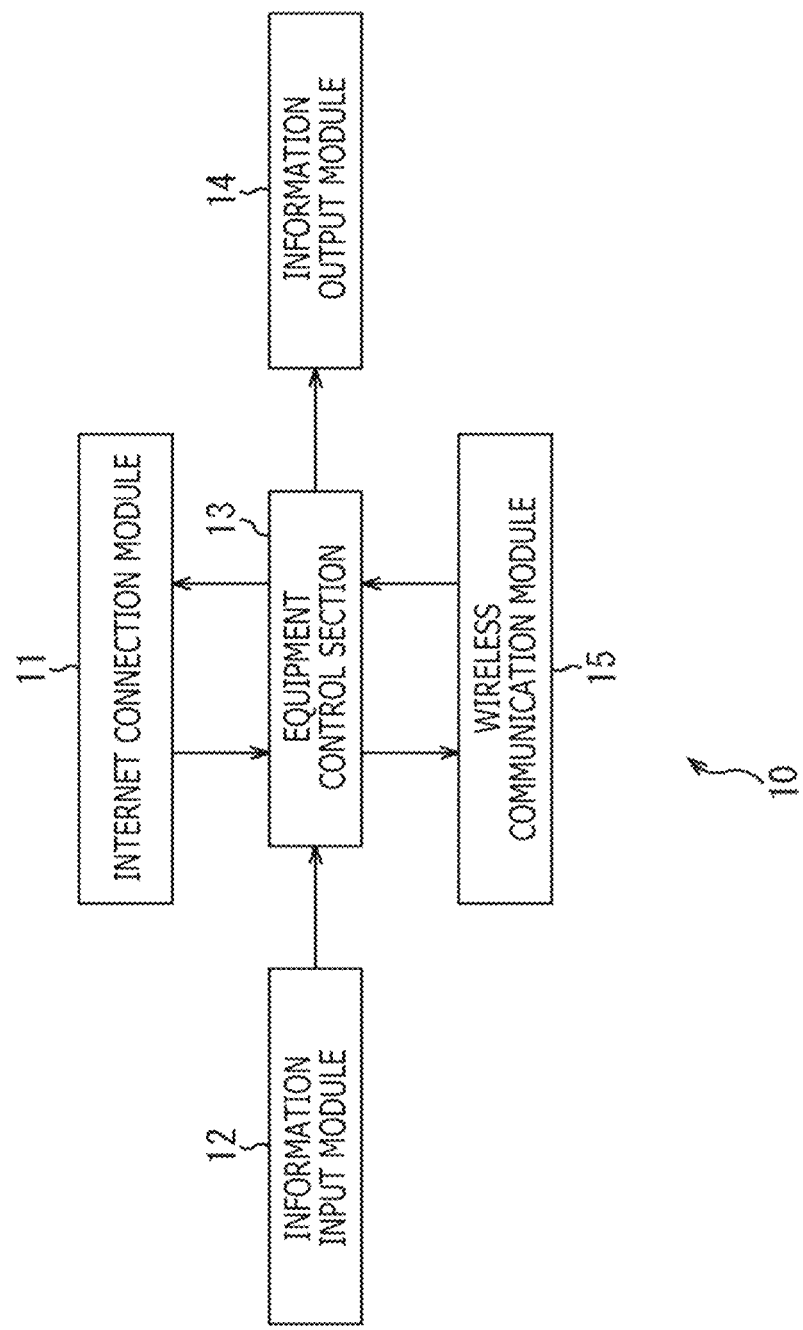
FIG. 12 is a block diagram illustrating a configuration example of a communication apparatus to which the present technology is applied.

FIG. 12 is a block diagram illustrating a configuration example of a communication apparatus (wireless communication apparatus) to which the present technology is applied. A communication apparatus 10 illustrated in FIG. 12 is configured as the base station AP or the terminal station STA in the wireless network (FIG. 1). It should be noted that, in the case where there is a need to distinguish between the communication apparatus 10 on the transmission side and that on the reception side, the former will be denoted as the communication apparatus 10T and the latter as the communication apparatus 10R.

In FIG. 12, the communication apparatus 10 includes an internet connection module 11, an information input module 12, an equipment control section 13, an information output module 14, and a wireless communication module 15.

The internet connection module 11 includes, for example, a circuit having a function to connect to the Internet network via a service provider from an optical fiber network or other communication line as the base station AP, its peripheral circuitry, a microcontroller, a semiconductor memory, and the like. The internet connection module 11 handles processes associated with the Internet connection, under control of the equipment control section 13. For example, a function of a communication modem or the like for connecting to the Internet network is implemented in the internet connection module 11 in the case where the communication apparatus 10 functions as the base station AP.

The information input module 12 includes, for example, input devices such as push buttons, a keyboard, or a touch panel. The information input module 12 has a function to input instruction information corresponding to user instruction to the equipment control section 13.

The equipment control section 13 includes, for example, a microprocessor, a microcontroller, or the like. The equipment control section 13 controls different sections (modules) to allow for the communication apparatus 10 to function as the base station AP or the terminal station STA.

The equipment control section 13 handles processes performed on information supplied from the internet connection module 11, the information input module 12, or the wireless communication module 15. Also, the equipment control section 13 supplies information obtained as a result of processes performed by itself to the internet connection module 11, the information output module 14, or the wireless communication module 15.

For example, the equipment control section 13 supplies, during data transmission, transmission data handed over from an application at a higher layer of the protocol or the like to the wireless communication module 15 and hands over, during data reception, reception data supplied from the wireless communication module 15 to an application at a higher layer of the protocol or the like. That is, the equipment control section 13 handles a process of transferring transmission data or reception data exchanged between application equipment that handles processes associated with applications and the wireless communication module 15.

The information output module 14 includes, for example, an output device including a display element such as a liquid crystal display (LCD: Liquid Crystal Display), an organic EL display (OLED: Organic Light Emitting Diode), an LED (Light Emitting Diode) indicator, or the like.

The information output module 14 has a function to display information required for users on the basis of information supplied from the equipment control section 13. Here, information processed by the information output module 14 includes, for example, the operating state of the communication apparatus 10 and information acquired via the Internet network.

The wireless communication module 15 includes, for example, a wireless chip, peripheral circuitry, a microcontroller, a semiconductor memory, and the like. The wireless communication module 15 handles processes associated with wireless communication, under control of the equipment control section 13. The configuration of the wireless communication module 15 will be described in detail later with reference to FIG. 13.

It should be noted that, although an example of a wireless communication module incorporating a wireless communication chip, peripheral circuitry, and the like will be described here, the present technology is not limited to a wireless communication module and is applicable to a wireless communication chip, a wireless communication LSI, and the like. Further, it is optional whether to include an antenna in the wireless communication module.

Also, in the communication apparatus 10 illustrated in FIG. 12, the equipment control section 13 and the wireless communication module 15 are essential components. However, it is optional whether to include other components, namely, the internet connection module 11, the information input module 12, and the information output module 14.

That is, each of the communication apparatuses 10 that functions as the base station STA or the terminal station STA can include only necessary modules, and unnecessary portions are either simplified or not incorporated. More specifically, for example, the internet connection module 11 is incorporated only in the base station AP whereas the information input module 12 and the information output module 14 are incorporated only in the terminal station STA.

(Configuration Example of the Wireless Communication Module)

Figure 13:
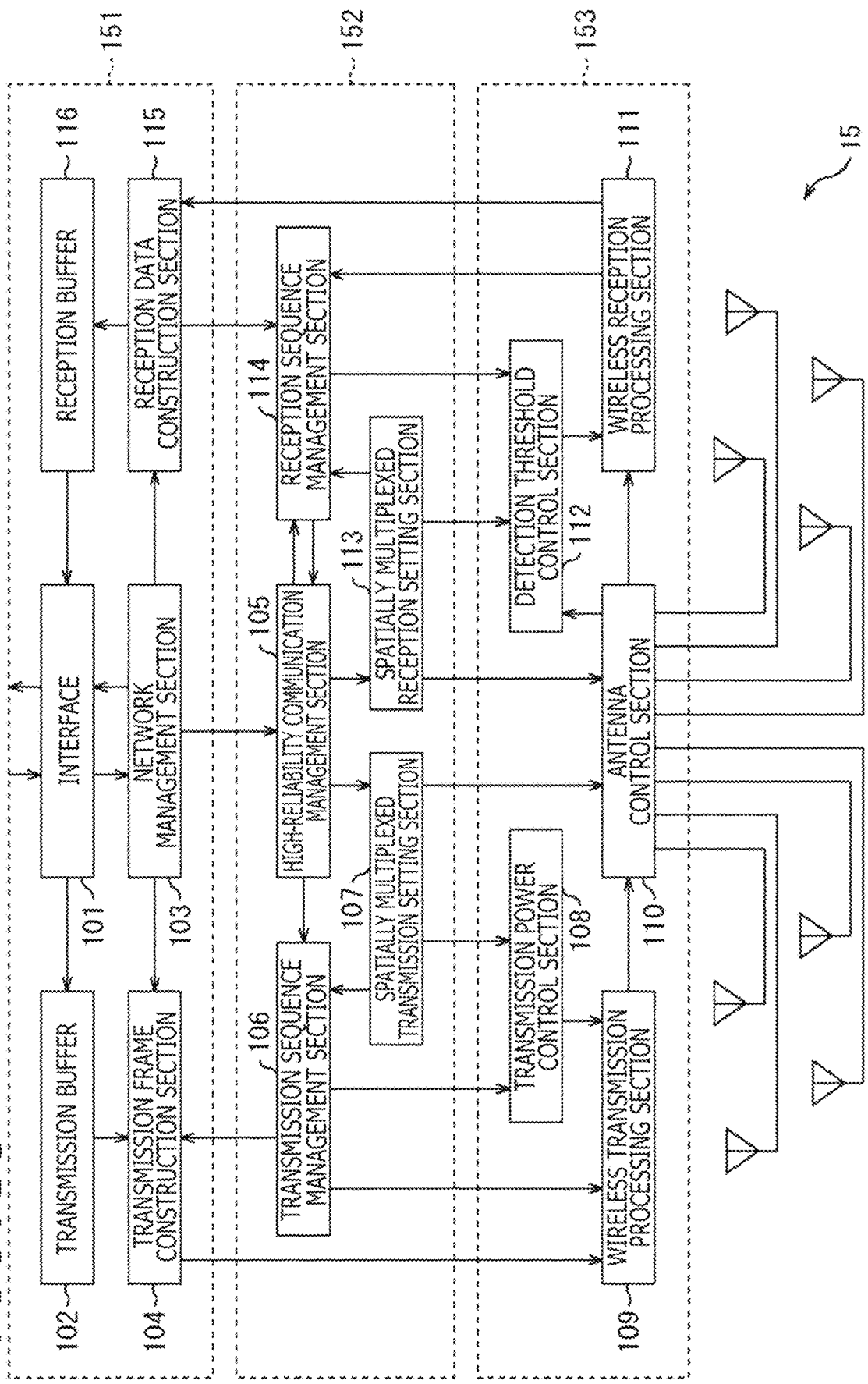
FIG. 13 is a block diagram illustrating a configuration example of a wireless communication module.

FIG. 13 is a block diagram illustrating a configuration example of the wireless communication module 15 illustrated in FIG. 12.

In FIG. 13, the wireless communication module 15 includes an interface 101, a transmission buffer 102, a network management section 103, a transmission frame construction section 104, a high-reliability communication management section 105, a transmission sequence management section 106, a spatially multiplexed transmission setting section 107, a transmission power control section 108, a wireless transmission processing section 109, an antenna control section 110, a wireless reception processing section 111, a detection threshold control section 112, a spatially multiplexed reception setting section 113, a reception sequence management section 114, a reception data construction section 115, and a reception buffer 116.

The interface 101 includes, for example, an input/output interface circuit and the like. The interface 101 exchanges data with the equipment control section 13 (FIG. 12) and has a function to exchange information input thereto or output therefrom in a predetermined signal format.

The interface 101 writes transmission data fed from the equipment control section 13 to the transmission buffer 102. Also, the interface 101 supplies information fed from the equipment control section 13 to the network management section 103 or outputs information supplied from the network management section 103 to the equipment control section 13.

The transmission buffer 102 includes, for example, a semiconductor memory such as buffer memory. The transmission buffer 102 temporarily stores transmission data written via the interface 101.

The network management section 103 manages address information and the like of the communication apparatus 10 in the wireless network. Also, the network management section 103 establishes connection with the Internet network in the case where the communication apparatus 10 functions as the base station AP. The network management section 103 exchanges a variety of information via the interface 101, supplying information regarding network management to the transmission frame construction section 104, the high-reliability communication management section 105, and the reception data construction section 115.

The transmission frame construction section 104 reads out transmission data stored in the transmission buffer 102 on the basis of information supplied from the network management section 103 and the transmission sequence management section 106, constructing a frame to be transmitted through wireless communication and supplying the frame to the wireless transmission processing section 109. Here, for example, a preamble signal and header information are generated to construct an A-MPDU as a frame.

The high-reliability communication management section 105 handles processes for carrying out high-reliability communication. For example, the high-reliability communication management section 105 sets the number of spatially multiplexed streams (spatial multiplexing count) and the number of aggregations (number of MPDUs aggregated in the A-MPDU) commensurate with reliability on the basis of information supplied from the network management section 103 and the like when a frame is sent as plural multiplexed streams, supplying information regarding the settings to the transmission sequence management section 106 and the spatially multiplexed transmission setting section 107.

The transmission sequence management section 106 handles processes for managing the order of subframes aggregated in the frame to be sent. For example, the transmission sequence management section 106 works in concert with the transmission frame construction section 104, the spatially multiplexed transmission setting section 107, the transmission power control section 108, and the wireless transmission processing section 109 to manage the order of subframes aggregated in the frame for each spatially multiplexed stream on the basis of information supplied from the high-reliability communication management section 105 and the like.

The spatially multiplexed transmission setting section 107 handles processes for setting parameters for each spatially multiplexed stream. For example, the spatially multiplexed transmission setting section 107 works in concert with the transmission sequence management section 106, the transmission power control section 108, and the antenna control section 110 to set parameters for each spatially multiplexed stream on the basis of information supplied from the high-reliability communication management section 105 and the like such that a predetermined preamble signal is appended.

The transmission power control section 108 controls transmission power such that a signal does not reach an undesired radio wave reach range in the case where a predetermined frame is sent to the wireless transmission processing section 109. Here, for example, the transmission power control section 108 has a function to adjust the transmission power to a minimum required level for data transmission in such a manner that a signal reaches the communication apparatus 10R on the reception side with an intended reception electric field strength, under control of the transmission sequence management section 106 and the spatially multiplexed transmission setting section 107.

The wireless transmission processing section 109 converts a frame sent through wireless communication into a baseband signal and processes the signal as an analog signal, supplying the transmission signal obtained as a result of processing thereof to the antenna control section 110. Here, the wireless transmission processing section 109 generates a transmission signal for sending a frame (frame including transmission data), supplied from the transmission frame construction section 104 as one or plural spatially multiplexed streams, under control of the transmission sequence management section 106 and the transmission power control section 108.

The antenna control section 110 includes plural antenna elements (e.g., eight antenna elements in the example illustrated in FIG. 13) connected together. The antenna control section 110 controls transmission of the transmission signal, supplied from the wireless transmission processing section 109, through wireless communication via the antenna elements. Also, the antenna control section 110 receives a transmission signal, sent through wireless communication via the antenna elements, supplying the transmission signal to the wireless reception processing section 111 and the detection threshold control section 112.

The wireless reception processing section 111 handles, in the case where a predetermined preamble signal is detected from the reception signal supplied from the antenna control section 110, processes for receiving header information and the data portion appended thereafter, under control of the detection threshold control section 112. Here, in the case where a frame is received as one or plural spatially multiplexed streams, the wireless reception processing section 111 supplies the frame to the reception sequence management section 114 and the reception data construction section 115.

A signal detection level is set in the detection threshold control section 112 that allows for detection of a wireless signal from the base station AP or the terminal station STA (the communication apparatus 10 thereof) in the case where transmission power is controlled by the transmission power control section 108. Here, the detection threshold control section 112 has a function to perform control such that a signal is detected with a minimum required detection threshold, allowing for detection of a signal with a level equal to or higher than a predetermined detection level as long as the channel is used currently.

Also, for example, the high-reliability communication management section 105 supplies information regarding the number of spatially multiplexed streams and the number of aggregations that can be handled and the like to the spatially multiplexed reception setting section 113 and the reception sequence management section 114 on the basis of information supplied from the network management section 103.

The spatially multiplexed reception setting section 113 handles processes for disassembling each stream for each spatially multiplexed stream and separating the stream as a frame. For example, the spatially multiplexed reception setting section 113 disassembles each of the spatially multiplexed streams received for each predetermined preamble signal and separates the stream as a frame on the basis of information supplied from the high-reliability communication management section 105 and works in concert with the antenna control section 110, the detection threshold control section 112, and the reception sequence management section 114 such that subframe data is received.

The reception sequence management section 114 handles processes for managing the order of subframes aggregated in the received (separated) frame. For example, on the basis of information and the like supplied from the high-reliability communication management section 105, the reception sequence management section 114 works in concert with the wireless reception processing section 111, the detection threshold control section 112, the spatially multiplexed reception setting section 113, and the reception data construction section 115 to manage the order of aggregated subframes for each separated frame.

The reception data construction section 115 removes predetermined header information from the frame supplied from the wireless reception processing section 111, extracting only the necessary data portion and writing the data portion to the reception buffer 116 as received data. This reception data is constructed, for example, by collecting error-free subframes from plural subframes aggregated in a predetermined sequence for each frame sent as plural multiplexed streams.

The reception buffer 116 includes, for example, a semiconductor memory such as buffer memory. The reception buffer 116 temporarily stores reception data written by the reception data construction section 115. The reception data stored in the reception buffer 116 is read out as appropriate and output to the equipment control section 13 via the interface 101.

It should be noted that, in FIG. 13, the different sections of the wireless communication module 15 can be classified into three blocks, namely, a transmission/reception data input/output section 151, a control section 152, and a wireless signal transmission/reception section 153, as indicated by a broken-line frame.

Here, the transmission/reception data input/output section 151 includes the interface 101, the transmission buffer 102, the network management section 103, the transmission frame construction section 104, the reception data construction section 115, and the reception buffer 116, primarily handling processes and control tasks associated with transmission data to be input and reception data to be output. Also, the control section 152 includes the high-reliability communication management section 105, the transmission sequence management section 106, the spatially multiplexed transmission setting section 107, the spatially multiplexed reception setting section 113, and the reception sequence management section 114, primarily handling processes and control tasks associated with frame transmission and reception. Further, the wireless signal transmission/reception section 153 includes the transmission power control section 108, the wireless transmission processing section 109, the antenna control section 110, the wireless reception processing section 111, and the detection threshold control section 112, primarily handling processes and control tasks associated with signals such as transmission and reception signals.

In the wireless communication module 15 configured as described above, the following processes are handled, in particular, by the control section 152 that includes the high-reliability communication management section 105, the transmission sequence management section 106, the spatially multiplexed transmission setting section 107, the spatially multiplexed reception setting section 113, and the reception sequence management section 114. That is, the control section 152 performs control such that plural aggregated subframes are sent in a predetermined sequence for each frame when a frame is sent as plural spatially multiplexed streams. Also, the control section 152 performs control such that original data is constructed for each frame by collecting error-free subframes from plural subframes aggregated in a predetermined sequence when a frame sent as plural spatially multiplexed streams is received.

(Actions of the Data Transmission Side)

Figure 14:
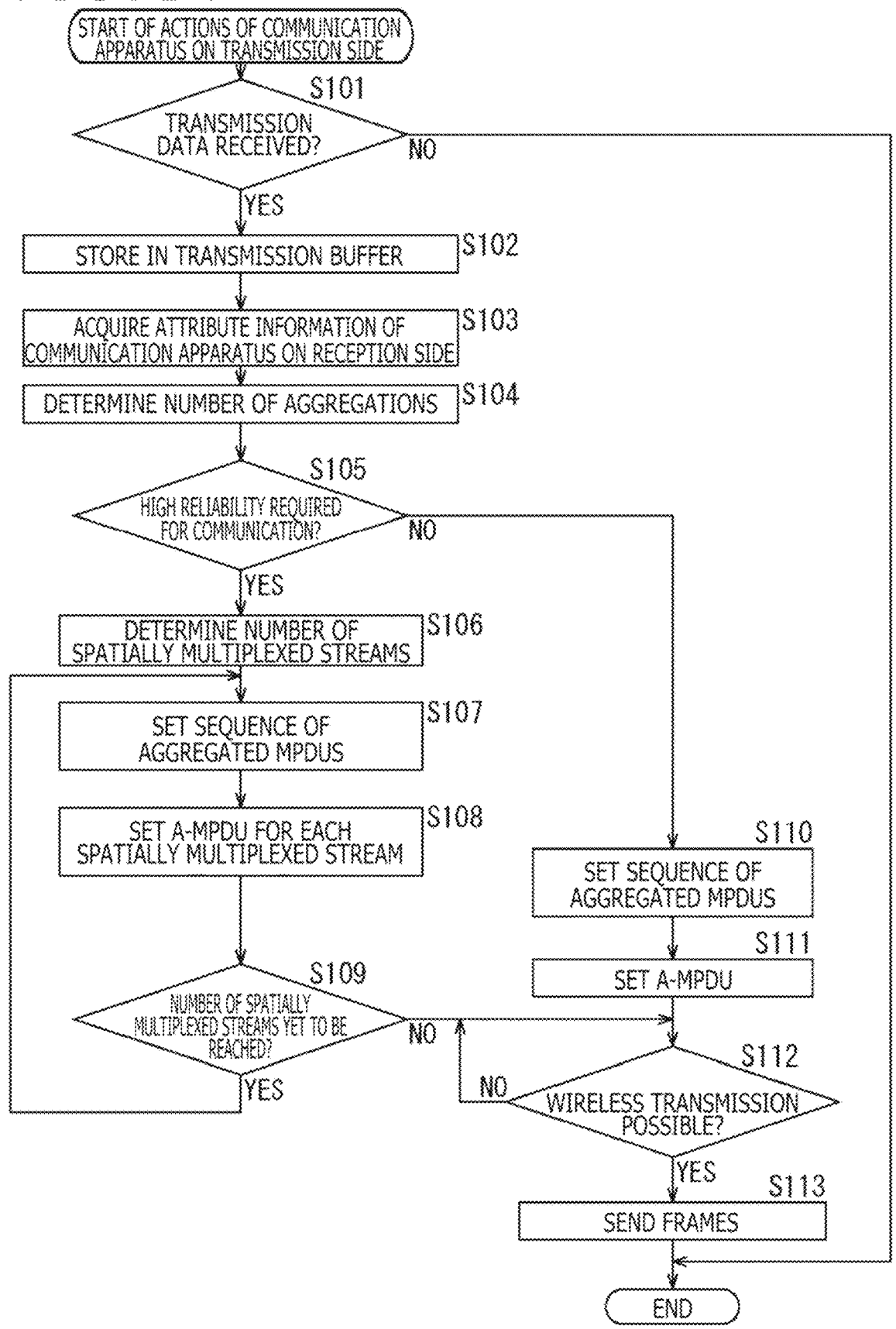
FIG. 14 is a flowchart describing actions of a communication apparatus on a frame transmission side.

A description will be given first of the actions of the communication apparatus 10T (wireless communication module 15 thereof) on the frame transmission side such as the base station AP10 or the base station AP20 illustrated in FIG. 1 with reference to the flowchart in FIG. 14.

The wireless communication module 15 decides whether transmission data has been received from connected application equipment via the interface 101 (S101). In the case where it is decided that transmission data has been received in this decision process ("YES" in S101), the received transmission data is stored in the transmission buffer 102, after which the processes from step S103 onward are performed.

That is, the control section 152 acquires attribute information of the communication apparatus 10R on the reception side, the receiver of the transmission data (S103) and determines the number of aggregations (S104).

Capability information (FIG. 4) acquired as parameters exchanged between the communication apparatus 10T on the transmission side and the communication apparatus 10R on the reception side when the communication apparatus 10R on the reception side joins the basic service set BSS, for example, can be used as this attribute information. As described above, capability information (FIG. 4) includes information such as maximum aggregate capability count information. Accordingly, the number of aggregations is determined by using these pieces of information.

The control section 152 decides whether high-reliability communication is required, for example, according to whether the communication apparatus 10R on the reception side can handle high-reliability communication and whether transmission data is of high importance (S105). In the case where it is decided that high-reliability communication will be carried out in this decision process ("YES" in S105), the processes from step S106 to step S109 are performed to carry out high-reliability spatially multiplexed transmission of the new scheme.

That is, the control section 152 determines the number of spatially multiplexed streams commensurate with reliability on the basis of information such as maximum spatial multiplexing capability count information included in capability information (S106). Also, the control section 152 sets the order of aggregated MPDUs (subframes) (S107) and sets an A-MPDU (frame) whose sequence varies from one spatially multiplexed stream to another (S108).

Then, it is decided whether the number of spatially multiplexed streams (spatial multiplexing count) has yet to reach the number determined by the process in step S106 (number commensurate with the reliability) (S109). In the case where it is decided in this decision process that the number of spatially multiplexed streams has yet to reach the number commensurate with the reliability, the process returns to step S107, and the processes in steps S107 and S108 are repeated, thus setting an A-MPDU (frame) whose sequence of aggregated MPDUs (subframes) varies from one spatially multiplexed stream to another.

As the processes from step S107 to step S109 are repeated, the setting of all the spatially multiplexed streams is completed, and in the case where it is decided that the number of spatially multiplexed streams has reached the number commensurate with the reliability, the process proceeds to step S112. Then, in the case where it is decided that the transmission line is capable of wireless transmission ("YES" in S112), the wireless signal transmission/reception section 153 sends an A-MPDU (frame) to the communication apparatus 10R on the reception side as plural multiplexed streams on the basis of the A-MPDU setting specified in the process in step S108 (S113).

Meanwhile, in the case where high-reliability communication will not be carried out ("NO" in S105), the processes in steps S110 and S111 will be performed. That is, the control section 152 sets the order of aggregated MPDUs (subframes) (S110), thus setting an A-MPDU (frame) with a predetermined sequence for a single spatially multiplexed stream (S111).

When the process in step S111 is completed, the process proceeds to step S112. Then, in the case where it is decided that the transmission line is capable of wireless transmission ("YES" in S112), the wireless signal transmission/reception section 153 sends an A-MPDU (frame) to the communication apparatus 10R on the reception side as a single spatially multiplexed stream on the basis of the A-MPDU setting specified in the process in step S110 (S113).

The actions of the communication apparatus 10T on the frame transmission side have been described above.

(Actions of the Data Reception Side)

Figure 15:
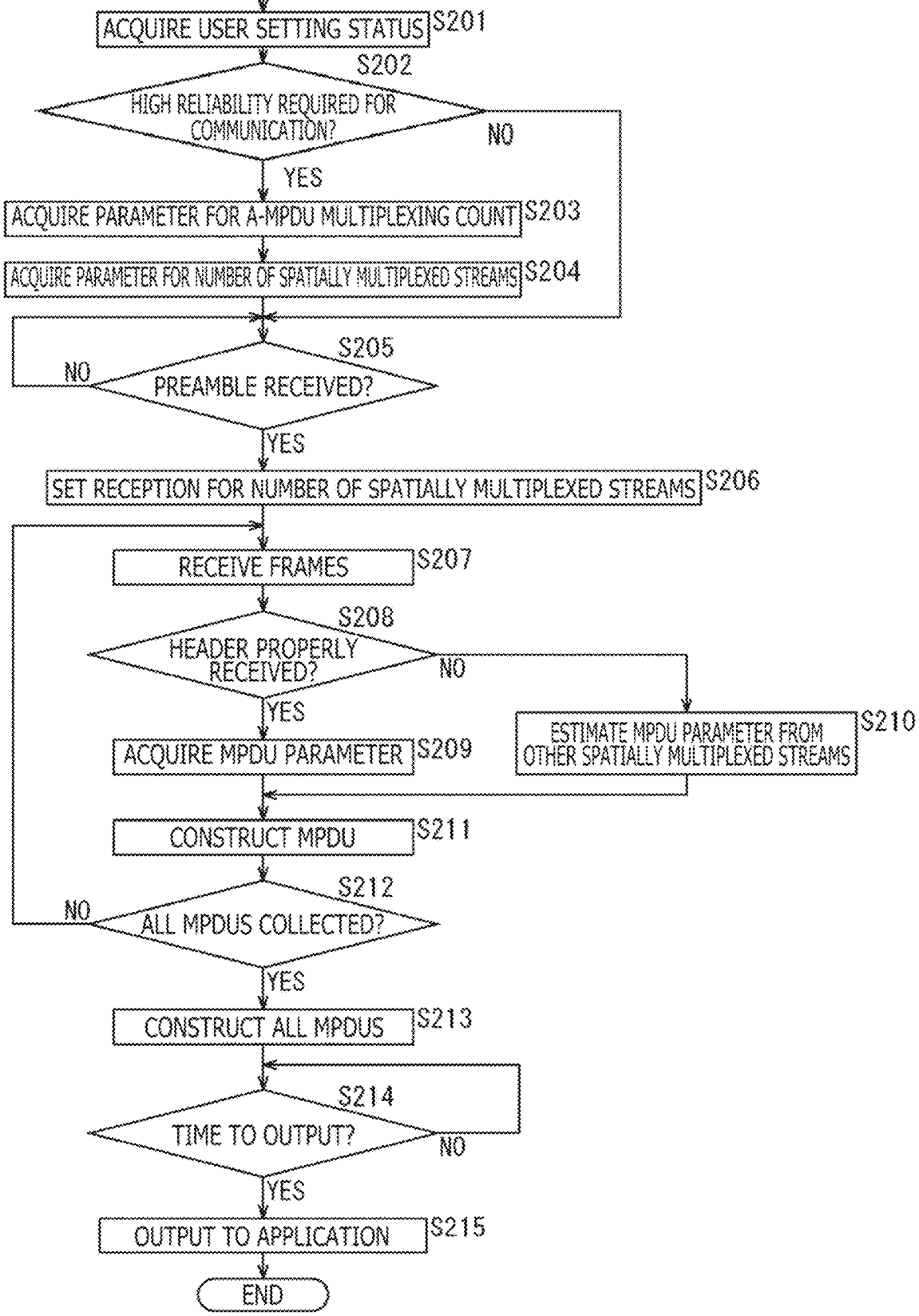
FIG. 15 is a flowchart describing actions of a communication apparatus on a frame reception side.

A description will be given next of the actions of the communication apparatus 10R (wireless communication module 15 thereof) on the frame reception side such as the terminal station STA11 or the terminal station STA21 illustrated in FIG. 1 with reference to the flowchart in FIG. 15.

The wireless communication module 15 acquires a user setting status (S201) and decides whether high-reliability communication is required on the basis of the setting status in question (S202). That is, the communication apparatus 10R on the frame reception side decides whether to carry out high-reliability spatially multiplexed transmission of the new scheme according to the user setting. In the case where it is decided that high-reliability spatially multiplexed transmission will be carried out in this decision process ("YES" in S202), the process proceeds to step S203.

The control section 152 acquires parameters regarding the A-MPDU multiplexing count (i.e., number of aggregations) that can be handled and parameters regarding the number of spatially multiplexed streams that can be handled (S203 and S204). For example, information such as maximum aggregate capability count information and maximum spatial multiplexing capability count information included in capability information (FIG. 4) is used as these parameters.

When the process in step S204 is completed, the process proceeds to step S205. Also, in the case where it is decided that high-reliability communication will not be carried out ("NO" in S202), the processes in steps S203 and S204 will be skipped, and the process proceeds to step S205.

Then, the wireless communication module 15 decides whether a predetermined preamble signal, sent from the communication apparatus 10T on the transmission side, has been received (S205). Here, the decision process is repeated until a predetermined preamble signal is received, and in the case where it is decided that a predetermined preamble signal has been received, the process proceeds to step S206.

The wireless signal transmission/reception section 153 sets the reception commensurate with the number of spatially multiplexed streams included in the preamble signal received, under control of the control section 152 (S206), receiving the A-MPDU (frame) sent from the communication apparatus 10T on the transmission side as one or plural spatially multiplexed streams (S207). Here, the preamble signal (FIG. 3) includes not only a high-reliability spatial multiplexing flag but also information such as spatial multiplexing count information and aggregation count information. Accordingly, the reception is set up by using these pieces of information.

Then, the control section 152 decides whether MPDU Length information and the MAC headers appended to the MPDUs (subframes) aggregated in the A-MPDU (frame) received have been received properly (S208).

In the case where it is decided that these headers have been received properly in this decision process ("YES" in S208), the control section 152 acquires parameters regarding the MPDUs (S209). For example, in this case, MPDU information lengths are calculated (backward) from the A-MPDU information length as parameters regarding the MPDUs on the basis of information included in the preamble signal (information regarding Length), MPDU Length information included in the delimiter, and information included in the MAC header (information regarding Duration).

Meanwhile, in the case where it is decided that these headers will not be received properly ("NO" in S208), the control section 152 estimates the parameters regarding the MPDUs on the basis of MPDU Length information obtained from other spatially multiplexed streams in the case of high-reliability communication (S210). For example, in this case, MPDU information lengths included in the target spatially multiplexed stream are estimated as parameters regarding the MPDUs with the parameters obtained from other spatially multiplexed stream (spatially multiplexed stream including an A-MPDU different from the A-MPDU including the MPDUs whose headers are decided not to be received properly).

When the processes in steps S209 and S210 are completed, the process proceeds to step S211.

The transmission/reception data input/output section 151 constructs the MPDUs of predetermined lengths on the basis of the parameters obtained or estimated, under control of the control section 152 (S211). Here, it is decided by constructing the MPDUs in the process in step S211 whether all the MPDUs aggregated in the A-MPDU have been collected (S212). In the case where it is decided that all the MPDUs have yet to be collected in this decision process ("NO" in S212), the process returns to step S207, and the processes from step S207 to step S212 are repeated, thus allowing for continuation of the reception of the A-MPDU. Then, when it is decided that all the MPDUs have been collected ("YES" in S212), the process proceeds to step S213.

The transmission/reception data input/output section 151 constructs (reconstructs) all the MPDU data collected in sequential order, under control of the control section 152 (S213). The data (original data) constructed (reconstructed) as described above is stored in the reception buffer 116 as reception data.

Here, in the case where high-reliability communication, i.e., high-reliability spatially multiplexed transmission of the new scheme, is carried out, A-MPDUs (frames), sent as plural spatially multiplexed streams, are received, and original data is constructed (reconstructed) by collecting error-free MPDUs (subframes) from plural MPDUs (subframes) aggregated in each A-MPDU (frame) in a predetermined sequence. It should be noted that, at this time, the process of collecting all the MPDUs may be carried out in parallel for each spatially multiplexed frame. Meanwhile, in the case where high-reliability communication is not carried out, original data is constructed (reconstructed) by collecting error-free MPDUs (subframes) from an A-MPDU (frame) sent as a single spatially multiplexed stream.

Then, when it is time to output reception data stored the reception buffer 116 to predetermined application equipment ("YES" in S214), the wireless communication module 15 outputs the reception data to the application equipment via the interface 101 (S215).

The actions of the communication apparatus 10R on the data reception side have been described above.

As described above, the communication method (new scheme) to which the present technology is applied carries out communication by using a frame including plural subframes aggregated in a different order of sequence number for each spatially multiplexed stream, thus making it possible, for example, to have ready all subframe data by using subframes included in other spatially multiplexed frame even in the case where noise is included in a certain subframe in the time axis direction.

Simply speaking, for example, in the case of transmission using two spatially multiplexed streams, a frame transmitted by one of the spatially multiplexed streams includes subframes arranged in order of sequence number (in ascending order) whereas a frame transmitted by the other spatially multiplexed stream includes subframes arranged in reverse order of sequence number (in descending order), thus allowing for the communication apparatus 10R on the reception side to collect a complete set of all subframe data approximately halfway through the frame.

Accordingly, in the case where there is no transmission error, the communication apparatus 10R on the reception side can have ready a complete set of all subframe data halfway through the frame. This makes it possible for the communication apparatus 10T on the transmission side to suspend the transmission of the frame halfway through the frame and use the remaining time for a new communication sequence. Meanwhile, even if interference occurs at the same time (time zone), the sequence of aggregated subframes varies from one spatially multiplexed stream to another. As a result, from the viewpoint of the communication apparatus 10R on the reception side, errors occur in data of different subframes, thus allowing for data to be recovered by using subframe data to be received later.

This makes it possible to output received data to application equipment when all the subframe data is received without waiting for the end of the frames.

Also, when high-reliability spatial multiplexing is carried out, and if the number of spatially multiplexed streams is set equal to the number of frame aggregations (e.g., the fifth example illustrated in FIG. 10), the communication apparatus 10R on the reception side can collect all the subframes and use the remaining time for a new communication sequence as long as the first subframes in all the spatially multiplexed streams can be received without error. It should be noted that, in the communication method (new scheme) to which the present technology is applied, the number of spatially multiplexed streams can be adjusted commensurate with the degree of reliability required of the communication, and high-reliability spatial multiplexing can be carried out by using more spatially multiplexed streams in communication requiring higher reliability. As described above, it is possible to carry out reliable communication as necessary by adjusting the number of spatially multiplexed frames commensurate with the degree of reliability required of data to be transmitted. It should be noted that the term "highly reliable communication" here not only has a connotation of avoiding errors during transmission and keeping adverse impact of errors to a minimum but also reducing the transmission time.

2. Modification Example (Other Configuration Examples)

The communication apparatuses 10 (10T and 10R) are described above as being configured as the base stations AP or the terminal stations STA. However, the communication apparatus to which the present technology is applied may be configured as part of an apparatus included in the base station AP or the terminal station STA (e.g., a wireless communication module, a wireless chip or the like).

Also, the terminal station STA can be configured as electronic equipment having a wireless communication function such as a smartphone, a tablet terminal, a mobile phone, a personal computer, a digital camera, a gaming console, a TV receiver, a wearable terminal, or a speaker apparatus.

Also, the base station AP is described above as being the communication apparatus 10T on the frame transmission side, and the terminal station STA as being the communication apparatus 10R on the frame reception side. However, the transmission and reception sides may be inverted such that the terminal station STA functions as the communication apparatus 10T on the frame transmission side and that the base station AP functions as the communication apparatus 10R on the frame reception side. In this case, the terminal station STA handles the actions of the frame transmission side illustrated in the flowchart of FIG. 14 whereas the base station AP handles the actions of the frame reception side illustrated in the flowchart of FIG. 15.

It should be noted that embodiments of the present technology are not limited to those described above and can be modified in various ways without departing from the gist of the present technology.

It should be noted that the present technology can also have the following configurations:

(1)

A communication apparatus including:

a control section adapted to perform control such that plural aggregated subframes are sent in a predetermined sequence for each frame included in each of spatially multiplexed streams when a frame is sent to another communication apparatus as plural spatially multiplexed streams.

(2)

The communication apparatus according to the feature (1), in which the control section changes a sequence of the subframes for each of the frames.

(3)

The communication apparatus according to the feature (1) or (2), in which the control section determines the number of spatially multiplexed streams and the number of aggregated subframes commensurate with communication reliability.

(4)

The communication apparatus according to the feature (3), in which the control section determines the communication reliability commensurate with attributes of the another communication apparatus.

(5)

The communication apparatus according to the features (2) to (4), in which the control section includes, as the frame, at least one frame in which subframes are arranged in order of sequence number.

(6)

The communication apparatus according to the features (2) to (4), in which the control section includes, as the frame, at least one frame in which subframes are arranged in reverse order of sequence number.

(7)

The communication apparatus according to the features (2) to (4), in which the control section arranges, in each of the frames, the subframes such that the first subframes have different sequence numbers from each other.

(8)

The communication apparatus according to the feature (7), in which the subframes are arranged in ascending or descending order of sequence number.

(9)

The communication apparatus according to any one of the features (1) to (8), in which the frame is an A-MPDU, and the subframe is an MPDU.

(10)

A communication method including:

performing control such that plural aggregated subframes are sent in a predetermined sequence for each frame included in each of spatially multiplexed streams when a communication apparatus sends a frame to another communication apparatus as plural spatially multiplexed streams.

(11)

A communication apparatus including:

a control section adapted to perform control such that original data is constructed for each frame included in each of spatially multiplexed streams by collecting error-free subframes from plural subframes aggregated in a predetermined sequence when a frame sent from another communication apparatus is received as plural spatially multiplexed streams.

(12)

The communication apparatus according to the feature (11), in which the sequence of the subframes is changed for each of the frames.

(13)

The communication apparatus according to the feature (12), in which, as the frame, at least one frame is included in which the subframes are arranged in order of sequence number.

(14)

The communication apparatus according to the feature (12), in which, as the frame, at least one frame is included in which the subframes are arranged in reverse order of sequence number.

(15)

The communication apparatus according to the feature (12), in which the subframes are arranged in each of the frames such that the first subframes have different sequence numbers from each other.

(16)

The communication apparatus according to any one of the features (11) to (15), in which the control section halts the reception of the remaining subframes in the frame halfway through the reception of the frame when all the subframes for constructing the original data are collected as the error-free subframes.

(17)

The communication apparatus according to any one of the features (11) to (16), in which, when the error-free subframes are corrected, in a case where headers appended to the subframes are received properly, the control section calculates information lengths of the subframes from an information length of the frame on the basis of information included in the headers, and in a case where the headers are not received successfully, the control section estimates the information lengths of the subframes on the basis of information obtained from another spatially multiplexed stream.

(18)

The communication apparatus according to any one of the features (11) to (17), in which the control section decides that communication has undergone spatial multiplexing and frame aggregation on the basis of information included in a preamble signal appended to the frame.

(19)

The communication apparatus according to any one of the features (11) to (18), in which the frame is an A-MPDU, and the subframe is an MPDU.

(20)

A communication method including:

performing control such that original data is constructed for each frame included in each of spatially multiplexed streams by collecting error-free subframes from plural subframes aggregated in a predetermined sequence when a frame sent from another communication apparatus is received by a communication apparatus as plural spatially multiplexed streams.

Reference Signs List 10, 10R, 10T: Communication apparatuses
11: Internet connection module
12: Information input module
13: Equipment control section
14: Information output module
15: Wireless communication module
101: Interface
102: Transmission buffer
103: Network management section
104: Transmission frame construction section
105: High-reliability communication management section
106: Transmission sequence management section
107: Spatially multiplexed transmission setting section
108: Transmission power control section
109: Wireless transmission processing section
110: Antenna control section
111: Wireless reception processing section
112: Detection threshold control section
113: Spatially multiplexed reception setting section
114: Reception sequence management section
115: Reception data construction section
116: Reception buffer
151: Transmission/reception data input/output section
152: Control section
153: Wireless signal transmission/reception section
AP: Base station
STA: Terminal station

The invention claimed is:

1. A communication apparatus comprising:
control circuitry adapted to perform control such that plural aggregated subframes are sent in a predetermined sequence for each frame included in each of spatially multiplexed streams when a frame is sent to another communication apparatus as plural spatially multiplexed streams,
wherein the control circuitry:
changes a sequence of the subframes for each of the frames, and
arranges, in each of the frames, the subframes such that the first subframes have different sequence numbers from each other.

2. The communication apparatus according to claim 1, wherein
the control circuitry determines the number of spatially multiplexed streams and the number of aggregated subframes commensurate with communication reliability.

3. The communication apparatus according to claim 2, wherein
the control circuitry determines the communication reliability commensurate with attributes of the another communication apparatus.

4. The communication apparatus according to claim 1, wherein
the control circuitry includes, as the frame, at least one frame in which subframes are arranged in order of sequence number.

5. The communication apparatus according to claim 1, wherein
the control circuitry includes, as the frame, at least one frame in which subframes are arranged in reverse order of sequence number.

6. The communication apparatus according to claim 1, wherein
the subframes are arranged in ascending or descending order of sequence number.

7. The communication apparatus according to claim 1, wherein
the frame is an A-MPDU, and
the subframe is an MPDU.

8. A communication method comprising:
performing control such that plural aggregated subframes are sent in a predetermined sequence for each frame included in each of spatially multiplexed streams when a communication apparatus sends a frame to another communication apparatus as plural spatially multiplexed streams,
wherein the method further comprises:
changing a sequence of the subframes for each of the frames, and
including, as the frame, at least one frame in which subframes are arranged in reverse order of sequence number.

9. A communication apparatus comprising:
control circuitry adapted to perform control such that original data is constructed for each frame included in each of spatially multiplexed streams by collecting error-free subframes from plural subframes aggregated in a predetermined sequence when a frame sent from another communication apparatus is received as plural spatially multiplexed streams,
wherein the sequence of the subframes is changed for each of the frames, and
wherein the subframes are arranged in each of the frames such that the first subframes have different sequence numbers from each other.

10. The communication apparatus according to claim 9, wherein,
as the frame, at least one frame is included in which the subframes are arranged in order of sequence number.

11. The communication apparatus according to claim 9, wherein,
as the frame, at least one frame is included in which the subframes are arranged in reverse order of sequence number.

12. The communication apparatus according to claim 9, wherein
the control circuitry halts the reception of the remaining subframes in the frame halfway through the reception of the frame when all the subframes for constructing the original data are collected as the error-free subframes.

13. The communication apparatus according to claim 9, wherein,
when the error-free subframes are corrected,
in a case where headers appended to the subframes are received properly, the control circuitry calculates information lengths of the subframes from an information length of the frame on a basis of information included in the headers, and,
in a case where the headers are not received successfully, the control circuitry estimates the information lengths of the subframes on a basis of information obtained from another spatially multiplexed stream.

14. The communication apparatus according to claim 9, wherein
the control circuitry decides that communication has undergone spatial multiplexing and frame aggregation on a basis of information included in a preamble signal appended to the frame.

15. The communication apparatus according to claim 9, wherein
the frame is an A-MPDU, and
the subframe is an MPDU.

16. A communication method comprising:
performing control such that original data is constructed for each frame included in each of spatially multiplexed streams by collecting error-free subframes from plural subframes aggregated in a predetermined sequence when a frame sent from another communication apparatus is received by a communication apparatus as plural spatially multiplexed streams,
wherein the sequence of the subframes is changed for each of the frames, and
wherein, as the frame, at least one frame is included in which the subframes are arranged in reverse order of sequence number.

* * * * *